US010606855B2

(12) United States Patent
Pattabhiraman et al.

(10) Patent No.: US 10,606,855 B2
(45) Date of Patent: Mar. 31, 2020

(54) EMBEDDING ANALYTICS WITHIN TRANSACTION SEARCH

(71) Applicant: Oracle International Corporation, Redwood Shores, CA (US)

(72) Inventors: Balaji Pattabhiraman, Bangalore (IN); Kalpana Madhalam, Parramatta (AU); Rahul Mahashabde, Bangalore (IN); Virad Gupta, Fremont, CA (US); Venkata Gujjula, Pleasanton, CA (US); Deepankar Narayanan, Trivandrum (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 213 days.

(21) Appl. No.: 14/710,441

(22) Filed: May 12, 2015

(65) Prior Publication Data
US 2016/0012111 A1 Jan. 14, 2016

Related U.S. Application Data
(60) Provisional application No. 62/023,128, filed on Jul. 10, 2014.

(51) Int. Cl.
*G06F 16/248* (2019.01)
*G06F 16/28* (2019.01)
(52) U.S. Cl.
CPC .......... *G06F 16/248* (2019.01); *G06F 16/284* (2019.01)

(58) Field of Classification Search
CPC ............ G06F 17/30507; G06F 9/4443; G06F 17/30386; G06F 17/30551;
(Continued)

(56) References Cited

U.S. PATENT DOCUMENTS 5,911,138 A 6/1999 Li et al.
6,317,750 B1 11/2001 Tortolani et al.
(Continued)

OTHER PUBLICATIONS

The "Pivot Charting" Document, WebGrid.net Enterprise 6.0, Copyright 2007, Intersoft Solution Corp, 52 pages.*
(Continued)

*Primary Examiner* — Alex Gofman
*Assistant Examiner* — Linh Black
(74) *Attorney, Agent, or Firm* — Tarolli, Sundheim, Covell & Tummino LLP

(57) ABSTRACT

A system and method facilitating data search, analysis, and/or related actions or data modifications in an enterprise computing environment. An example method includes providing a first user option to specify a transaction search; providing a second user option to specify an analytic; and employing an integrated analytics and search framework to present one or more search results via the analytic in response to user selection of the first user option. In a more specific embodiment, the first user option further enables user specification of one or more dimensions of a data component used for a search, by manipulation of an analytics setting. A third user option enables user modification of search data returned as search results and/or may enable users to perform related actions, e.g., approval of expense reports. Additional controls may enable selective user access to functionality depending upon content of the search results.

18 Claims, 13 Drawing Sheets

(58) Field of Classification Search
CPC ............ G06F 17/30566; G06F 16/904; G06Q 10/06311; G06Q 10/10; G06N 5/02; G06N 5/04; G06N 5/022
USPC .................. 707/600, 603, 796–798, 805
See application file for complete search history.

(56) References Cited

U.S. PATENT DOCUMENTS

| | | |
|---|---|---|
| 6,581,054 B1 | 6/2003 | Bogrett |
| 6,707,454 B1 | 3/2004 | Barg et al. |
| 7,181,450 B2 | 2/2007 | Malloy et al. |
| 7,315,849 B2 | 1/2008 | Bakalash et al. |
| 7,333,982 B2 | 2/2008 | Bakalash et al. |
| 7,334,223 B2 | 2/2008 | Kumar |
| 7,590,652 B2 | 9/2009 | Passey et al. |
| 7,660,793 B2* | 2/2010 | Indeck .................. G06F 16/353 707/999.005 |
| 7,698,348 B2 | 4/2010 | Walker |
| 7,912,845 B2 | 3/2011 | Barstow |
| 7,941,394 B2 | 5/2011 | Error |
| 7,970,728 B2 | 6/2011 | Honzal et al. |
| 8,180,713 B1* | 5/2012 | Rigby ..................... G06Q 40/06 706/12 |
| 8,359,299 B2 | 1/2013 | Angus et al. |
| 8,615,533 B2* | 12/2013 | Johnson ................. G06Q 10/06 707/805 |
| 8,640,037 B2 | 1/2014 | Goodwin |
| 8,661,023 B1* | 2/2014 | Chun ............... G06F 17/30961 707/718 |
| 8,751,544 B2 | 6/2014 | Mui et al. |
| 9,704,162 B2 | 7/2017 | Bhatia et al. |
| 9,742,724 B2 | 8/2017 | Bailey |
| 9,813,064 B2 | 11/2017 | Low et al. |
| 2002/0184187 A1 | 12/2002 | Bakalash et al. |
| 2003/0033192 A1 | 2/2003 | Zyman et al. |
| 2004/0122884 A1 | 6/2004 | Lee |
| 2005/0160399 A1 | 7/2005 | Kumar |
| 2005/0179684 A1 | 8/2005 | Wallace |
| 2006/0173812 A1* | 8/2006 | Bahl ..................... G06F 16/283 |
| 2007/0244650 A1 | 10/2007 | Gauthier |
| 2008/0046808 A1 | 2/2008 | Malkin et al. |
| 2008/0288889 A1* | 11/2008 | Hunt ..................... G06Q 30/02 715/810 |
| 2009/0018996 A1* | 1/2009 | Hunt ..................... G06Q 30/02 |
| 2009/0187815 A1* | 7/2009 | Becerra, Sr. ......... G06F 3/04815 715/212 |
| 2009/0216808 A1 | 8/2009 | Wallace |
| 2009/0271238 A1 | 10/2009 | Himley et al. |
| 2009/0319544 A1* | 12/2009 | Griffin ............... G06F 17/30557 |
| 2010/0156889 A1* | 6/2010 | Martinez ............... G06F 16/248 345/418 |
| 2011/0179086 A1* | 7/2011 | Morinville ............ G06F 21/604 707/797 |
| 2012/0078845 A1 | 3/2012 | Kasbekar |
| 2012/0123924 A1* | 5/2012 | Rose ..................... G06Q 20/12 705/35 |
| 2012/0185425 A1* | 7/2012 | Reeves ............... G06F 17/30592 707/600 |
| 2012/0198369 A1* | 8/2012 | Sorin ..................... G06Q 10/10 715/763 |
| 2012/0214142 A1 | 8/2012 | Togawa |
| 2013/0055128 A1 | 2/2013 | Muti et al. |
| 2013/0145244 A1* | 6/2013 | Rothschiller ......... G06F 17/246 715/212 |
| 2013/0185624 A1 | 7/2013 | Appleyard et al. |
| 2013/0197953 A1 | 8/2013 | Sholes et al. |
| 2014/0019415 A1 | 1/2014 | Barker et al. |
| 2014/0249999 A1* | 9/2014 | Johnson ............... G06Q 20/027 705/39 |
| 2014/0280284 A1* | 9/2014 | Emanuel ........... G06F 17/30651 707/766 |
| 2014/0282910 A1* | 9/2014 | Palmer .............. G06F 17/30575 726/4 |
| 2015/0220607 A1 | 8/2015 | Chakra et al. |
| 2015/0381931 A1 | 12/2015 | Uhma et al. |
| 2017/0235786 A9* | 8/2017 | Faith ...................... G06Q 30/06 707/607 |

OTHER PUBLICATIONS

IBM Corporation—"Content Analytics with Enterprise Search"; obtained at http://public.dhe.ibm.com/common/ssi/ecm/en/zzd03138usen/ZZD03138USEN.pdf; version 3.0; Jun. 2012; 8 pgs.

Meyer, David; SAP Marries Transaction Processing with Analytics by Putting Business suite on Hana; obtained at http://gigaom.com/2013/01/11/sap-marries-transaction-processing-with-analytics-by-putting-business-suite-on-hana/; Jan. 11, 2013; 4 pgs.

Stolte, Chris, et al.; "Polaris: A System for Query, Analysis, & Visualization of Multidimensional Relational Databases"; http://graphics.stanford.edu/papers/polaris_extended/polaris.pdf; Jan.-Mar. 2002; 14 pgs.

Qlik View Business Intelligence; obtained at http://www.visualintelligence.co.nz/QlikView.php; downloaded Aug. 20, 2014; 3 pgs.

Qlik View Business Discovery Platform; obtained at http://www.qlik.com/en/explore/products/qlikview; downloaded Aug. 20, 2014; 4 pgs.

MicroStrategy Web; obtained at http://www.microstrategy.com/us/software/products/web; Copyright 2010; downloaded Aug. 20, 2014; 12 pgs.

Lite Point IQ frame; http://docs.evergreen-ils.org/2.1/html/generate-report.html.

Creating a chart; https://docs.campaign.adobe.com/doc/AC6.1/en/RPT_Creating_new_reports_Creating_a_chart.html.

U.S. Office Action corresponding to U.S. Appl. No. 14/710,441, dated Apr. 5, 2018, pp. 1-28.

Assigning Hierarchies and Measures; http://help.infragistics.com/Help/Doc/LightSwitch/2012.2/CLR4.0/html/Pivot_Grid_Assigning_Hierarchies_and_Measures.html; Copyright 2012, downloaded circa Aug. 21, 2014; 5 pgs.

Microstrategy9 Basic Reporting; http://www2.microstrategy.com/producthelp/9.4/manuals/en/BasicReporting.pdf; Copyright 2013; downloaded circa Aug. 21, 2014; 490 pgs.

Business Intelligence: Multidimensional Data Anlysis; http://www8.cs.umu.se/education/examina/Rapporter/PerWesterlund.pdf; Aug. 20, 2008; 58 pgs.

OLAP Pivot Grid for WPF; https://www.syncfusion.com/products/wpf/bi-pivotgrid; Copyright 2001-2015; downloaded circa Aug. 21, 2014; 24 pgs.

VCL Pivot Grid; https://www.devexpress.com/Products/vcl/ExPivotGrid/; downloaded circa Aug. 21, 2014; 3 pgs.

Kinamu Reporter; http://dl.sugarforge.org/kinamureporter/02KReporter/V2.5/Release_Notes_v2.5.pdf; Apr. 2010; 30 pgs.

E21 Analytics; http://www.tgiltd.com/whitepapers/e21 analytics/E21Analytics%20Users%20Guide.pdf; downloaded circa Aug. 21, 2014; 62 pgs.

Understanding RadPivotGrid; http://www.telerik.com/help/wpf/radpivotgrid-started-understanding-pivot.html; Copyright 2002-2015; downloaded circa Aug. 21, 2014; 1 pg.

U.S. Office Action corresponding to U.S. Appl. No. 14/710,448 dated Apr. 2, 2019.

Final Office Action for U.S. Appl. No. 15/217,836 dated Jun. 26, 2019.

* cited by examiner

Browser XYZ

...URL for Enterprise App...

◀ Back | Travel Authorization (Transaction Page of Search Result) | 70 →

← 60
← 300
← 304 Save
← 306 Submit

Report: 00012345
Description: Learning Sciences
Business Purpose: General Travel and Expense ← 292
Comments: Learning Sciences ← 308
← 310 Approve Transaction ← 312
Travel From: [ 🔍 ] ← 314
Travel To: [ 🔍 ] ← 316
Date From: 03/24/2009 ← 318
Date To: 03/25/2009 ← 320

← 322

| Description ⇅ | Merchant ⇅ | Amount ⇅ | Account Detail | Actions |
|---|---|---|---|---|
| Learning Sci. | | $200.00 | ▦ ← 288 | ⊙ ← 290 |

324 →
326 →
286 ↲

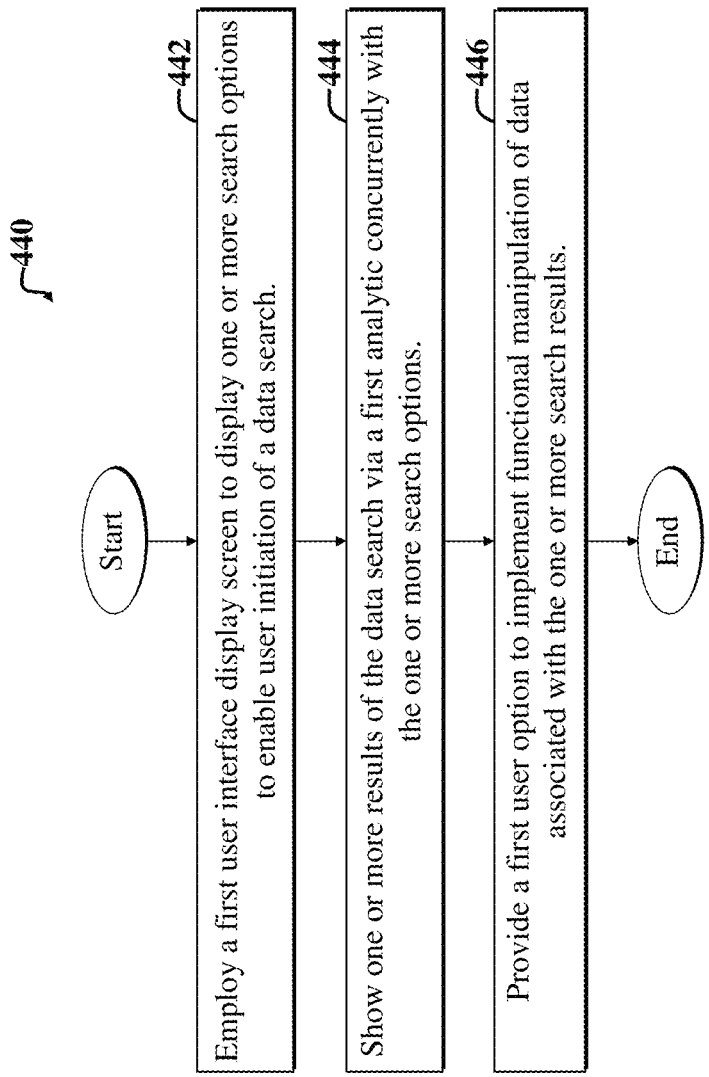

EMBEDDING ANALYTICS WITHIN TRANSACTION SEARCH

CROSS REFERENCES TO RELATED APPLICATIONS

This application claims priority from U.S. Provisional Patent Application Ser. No. 62/023,128, entitled EMBEDDING ANALYTICS WITHIN TRANSACTION SEARCH, filed on Jul. 10, 2014, which is hereby incorporated by reference as if set forth in full in this application for all purposes.

This application is related to the following application, U.S. patent application Ser. No. 14/710,448, entitled HIERARCHICAL DIMENSION ANALYSIS IN MULTI-DIMENSIONAL PIVOT GRIDS, filed on May 12, 2015, which is hereby incorporated by reference, as if set forth in full in this specification:

BACKGROUND

The present application relates to computing, and more specifically to software, User Interfaces (UIs), methods, and accompanying systems for generating, viewing, and/or modifying search results and associated data.

Methods for generating and viewing search results (e.g., via search reports) are employed in various demanding applications, including enterprise transaction searches, general Internet content searches, and so on. Such applications often demand rapid searches that generate relevant results and associated insights applicable to entered search information, e.g., search words, transaction identification codes, image search data, filtering criteria, and so on.

Insightful search results can be particularly important in enterprise applications, where search results are often leveraged and relied upon to make important decisions. Conventionally, enterprise-related searches, such as transaction searches, may return simple lists of results.

However, basic listings can lack insightful mechanisms and functionality for conveying information about the search results. To modify data appearing in search results, and/or to access insights pertaining to search results, users must often navigate different links and/or open separate applications or windows, e.g., data analysis applications or windows. This process can be costly and time consuming, and search context may be lost.

Accordingly, important insights in search results can be readily overlooked. Furthermore, invoking separate analytics engines to analyze search results can be inefficient and cumbersome, both from a computational perspective and a user experience perspective.

SUMMARY

An example method for facilitating data analysis and/or modification and related actions in an enterprise computing environment includes providing a first user option to specify a transaction search; providing a second user option to specify an analytic; and employing an integrated analytics and search framework to present one or more search results via the analytic in response to user selection of the first user option.

In a more specific example embodiment, the first user option further includes one or mechanisms (e.g., user interface controls) enabling user specification of one or more dimensions of a data component used for a search, by manipulation of an analytics settings. The example method may further include adjusting a display of the search results to include one or more user interface controls for enabling selective user access to functionality depending upon content of the search results.

The one or more user interface controls may further provide user options to functionally manipulate displayed data (including metadata) associated with the search results, e.g., to change data; to perform actions pertaining to the data, and so on. An example of functional manipulation may include approval of an expense report, whereby metadata associated with the expense report is adjusted to indicate that the expense report is approved.

The integrated analytics and search framework may include a runtime that is adapted to employ one or more analytics to drive the transaction search in response to user selection of the first user option. The example method may further include displaying a user interface display screen showing both one or more search results and one or more analytics pertaining to the one or more search results.

A third user option may enable users to specify one or more dimensions for use in organizing the search results via the analytic. The analytic may include a pivot grid or chart displayed in the user interface display screen, and/or may include one or more visualizations linked to the pivot grid or chart, such that when data, dimensions, or arrangements in the pivot grid or chart change, corresponding adjustments are made to the visualization, whether or not the visualization is currently displayed. Similarly, changes effected by user manipulation of the visualization may automatically reflect in changes to the pivot grid or chart, whether or not the pivot grid or chart is currently displayed.

A fourth user option may enable user initiation of a change in the user interface display screen, whereby the user interface display screen changes from displaying a chart illustrating the search results to a pivot grid. An additional user option may enable a user to specify one or more dimensions of search results in advance of the transaction search. Another user option may enable adjustment to one or more analytics settings, resulting in adjusted analytics settings in response thereto.

The example method may further include employing the analytics settings to determine the dimensions, and then using the dimensions to facilitate implementing the search. User options for saving the adjusted analytics settings (and the entire data analysis session) and displaying an analytic characterized by the dimensions may be provided. Accordingly, certain embodiments disclosed herein enable users to initiate software actions on analytics that drive search results and enable user actions on search fields that then drive the analitics. These user options are enabled in part by using the same framework for search and analytics functions. For example, application of a search filter triggers chart (analytics) refresh in accordance with the applied filter criteria. Similarly, user selection of a data point on a chart may result in narrowing of listed search results based on the selected data point.

Note that conventionally, certain enterprise software may provide user options for performing search tasks, while separate analytics engines may then facilitate analyzing the search results. For example, in certain enterprise applications, use of discrete or separate analytics and search frameworks and associated runtime code may necessitate navigation to different user interface display screens of separate software applications to enable viewing of transaction details and to analyze aggregated data associated with the transactions.

For example, a manager wishing to approve an employee expense report may be required to navigate to an expenses component or software application to then search for the transaction used to approve the expense report. Similarly, a manager wishing to view total expenses paid to the employee for the past year navigates to an analytics dashboard that is substantially separate from the search application. This can be relatively tedious and costly.

Nevertheless, even if certain conventional enterprise software applications were to combine displayed search results and analytics in the same user interface display screen, computational inefficiencies may still result from use of substantially non-coordinated and disparate components or frameworks for implementing searches and performing analytics.

Accordingly, certain embodiments discussed herein may be implemented via software that includes analytics functionality embedded in transaction search pages across the application. Interactive charts, multi-dimensional pivot grids, graphics (e.g., charts and other visualizations) and facets can be integrated into every transaction search page, providing context and insight into data and enhance search experience.

End users can now open analytics (e.g., charts and pivot grids) related to searched components within any transaction search pages and may further modify the data and/or perform related actions (e.g., approving expense reports, sending emails, and so on). This facilitates rapid data trend and performance analysis of search result data.

The search result data may be manipulated, e.g., via multi-dimensional pivoting and faceting using the various predetermined dimensions and via associated actions and data modification options. As discussed herein, use of the same framework for search and analytics may reduce or eliminate any additional computer processing overhead or data maintenance overhead used to implement analytics, search, and data modification functionality and related actions.

A further understanding of the nature and the advantages of particular embodiments disclosed herein may be realized by reference of the remaining portions of the specification and the attached drawings.

BRIEF DESCRIPTION OF THE DRAWINGS

FIG. 2B illustrates a second example UI display screen that is adapted to present UI controls for initiating data searches, filtering, analysis, and so on, and for presenting search results via a search and analysis section.

FIG. 3 illustrates a third example UI display screen, appearing after user selection of a chart UI control, facet filters, and after entry of query parameters in the second UI display screen of FIG. 2.

FIG. 7 illustrates a eighth example UI display screen, showing a transaction authorization window activated in response to user selection of a transaction listed in the sixth example UI display screen of FIG. 6, whereby user options are provided for enabling data modification and other actions.

FIG. 11 is a flow diagram of a second example method adapted for use with the embodiments of FIGS. 1-9.

DETAILED DESCRIPTION OF EMBODIMENTS

Figure 1:
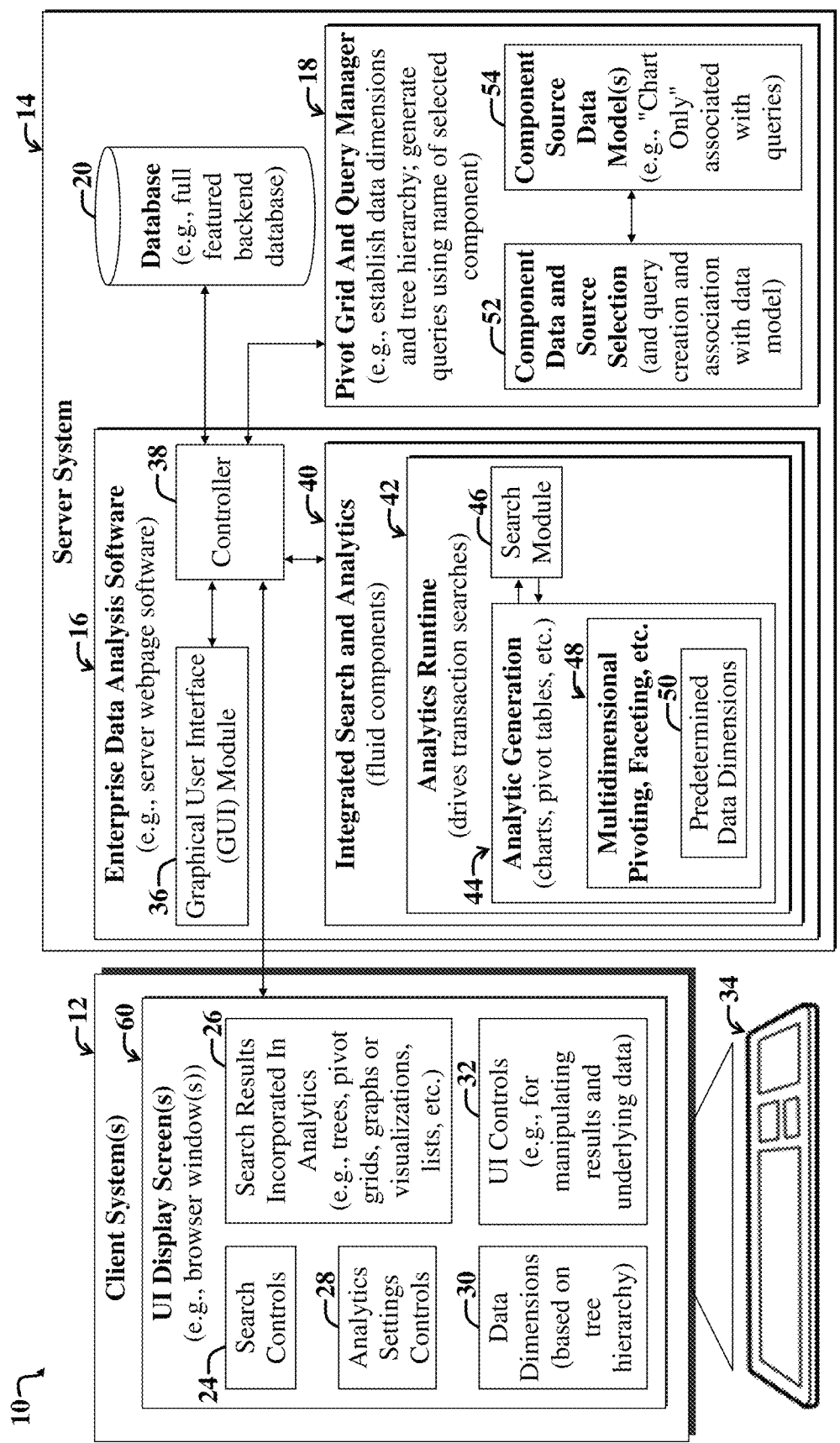
FIG. 1 illustrates a first example system and accompanying enterprise computing environment facilitating integration of transaction search results and analytics, and enabling functional manipulation of search results and associated analytics.

Conventionally, in certain enterprise applications, use of discrete analytics and search frameworks and associated runtime code may necessitate navigation to different user interface display screens within the application to view transaction details and to analyze aggregated data associated with the transactions. For example, a manager wishing to approve an employee expense report may be required to navigate to an expenses component to then search for the transaction used to approve the expense report. Similarly, a manager wishing to view total expenses paid to the employee for the past year navigates to an analytics dashboard.

Nevertheless, even if certain enterprise software applications combine displayed search results and analytics results in the same user interface display screen, computational inefficiencies may still result from using non-coordinated substantially disparate components or frameworks for implementing searches and performing analytics. Furthermore, such systems may exhibit reduced ability to maintain or provide context information that may be employed by a user to make more informed decisions, e.g., as to whether or not to approve a particular transaction.

For the purposes of the present discussion, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

Software functionality may be any function, capability, or feature, e.g., stored or arranged data, that is provided via computer code, i.e., software. Generally, software functionality may be accessible via use of a user interface, and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

An enterprise computing environment may be any collection of computing resources of an organization used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include Human Resources (HR) (e.g., enterprise personnel), financial resources, assets, employees, business contacts, sales data, and so on, of an enterprise. Examples of enterprise software include Enterprise Resource Planning (ERP) software for facilitating managing enterprise activities (e.g., product planning, inventory management, marketing, sales, and so on). Example ERP applications include Customer Relationship Management (CRM), Human Capital Management (HCM), Business Intelligence (BI), enterprise asset management, enterprise asset management, corporate performance and governance applications, and so on.

The terms "enterprise software" and "enterprise application" may be employed interchangeably herein. However, an enterprise application may include one or more enterprise software modules or components, such as User Interface (UI) software modules or components.

Enterprise data may be any information pertaining to an organization or business, including information about customers, appointments, meetings, opportunities, travel expenses, customer interactions, financial accounts, projects, tasks, resources, orders, enterprise personnel, and so on. Examples of enterprise data include work-related notes, appointment data, customer contact information, descriptions of work orders, asset descriptions, photographs, contact information, calendar information, enterprise hierarchy information (e.g., corporate organizational chart information), and so on.

For clarity, certain well-known components, such as hard drives, processors, operating systems, power supplies, routers, Internet Service Providers (ISPs), identity management systems, workflow orchestrators, Tenant Automation Systems (TASs), certain web services, Application Programming Interfaces (APIs), and so on, are not necessarily explicitly called out in the figures. However, those skilled in the art with access to the present teachings will know which components to implement and how to implement them to meet the needs of a given implementation.

FIG. 1 illustrates an enterprise computing environment with an example system 10 for facilitating display of integrated transaction search results and analytics via User Interface (UI) display screen(s) 22, and for enabling functional manipulation of displayed search results and associated analytics 26.

For the purposes of the present discussion, functional manipulation of data may refer to any use of or modification of the data or modification of a data object associated with the data, wherein the modification involves a software action other than merely displaying the data. Accordingly, search result data is said to be functionally manipulated if the search result data is used or modified to perform functions or software actions other than merely displaying the data in various ways.

For example, approval of an expense report associated with or included in an object associated with a search result may represent a type of functional manipulation. Other examples include modification of actual data of an underlying data object shown among search results, other types of actions, and so on.

In one embodiment, functional manipulation of a data object may change a state of the data object from one of a plurality of optionally sequential states in the lifecycle of the data object. For example, an expense report object may transition from a drafting state, to a submitted state, to an approved or rejected state, and, if approved, to a paid and closed state. The number, type and sequence of states can vary.

For the purposes of the present discussion, an object, such as a data object, may be any grouping of or encapsulation of data and/or functionality. Examples of objects include classes or structures implemented via object-oriented programming languages; tables, rows, or records of a database; and so on. An object may include a single item or instance of data, such as a number or other descriptor or attribute, or the object may include plural instances of data and/or functionality (e.g., software methods, such as functions or function calls) and may further include sub-objects.

A business object may be any object used to organize information for business purposes. An example business object may be an employee object, which may include sub-objects, such as sub-objects for business trips taken by the employee. Another object may include a business transaction object, which holds information pertaining to a particular set of activities, expenses, etc., associated with a particular task (e.g., travel), goal, project, and so on.

A representation of an object, i.e., a displayed object, may be displayed via graphical depiction, such as a node of a tree diagram, a menu item, dialog box, personnel icon, an entire user interface display screen, and so on. The graphical depiction of an object may also be called an object, a displayed object, or a node.

Generally, a node may be any graphical representation of an object or data dimension in a visualization. Note that certain nodes may include sub-nodes, just as an object may include or represent additional objects, i.e., sub-objects.

The example system 10 includes one or more client systems 12 (also simply called clients) in communication with an enterprise server system 14. The enterprise server system 14 includes enterprise data analysis software 16 (also simply called data analysis software) in communication with a backend database 20, which may be implemented as one or more relational databases (e.g., Microsoft SQL server, Oracle Database, etc.).

For the purposes of the present discussion, a server system may be any collection of one or more servers. A server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A Service Oriented Architecture (SOA) server may be any server that is adapted to facilitate providing services accessible to one or more client computers coupled to a network.

The enterprise data analysis software 16 communicates with a server-side pivot grid and query manager 18. The data analysis software 16 also communicates with the one or more client devices or computer systems 12 via a network, such as the Internet.

Note that, in general, groupings of various modules of the system 10 are illustrative and may vary, e.g., certain modules may be combined with other modules or implemented inside of other modules, or the modules may otherwise be distributed differently among a network or within one or more computing devices, without departing from the scope of the present teachings.

The example client system 12 includes various input and output mechanisms 34, e.g., keyboard, touchpad or mouse, monitor, processor, memory, network connection, and so on. The client system 12 is shown illustrating a UI display screen 60 with several sections 24-32. The example UI display screen 60 may be implemented via browser software in communication with the server-side enterprise data analysis software 16.

For the purposes of the present discussion, a user interface display screen may be any software-generated depiction presented on a display, e.g., monitor, touch screen, etc. Examples of depictions include windows, dialog boxes, displayed tables, and any other graphical user interface features, such as user interface controls, presented to a user via software, such as a browser. A user interface display screen contained within a single border may be called a view or window. Views or windows may include sections, such as sub-views or sub-windows, dialog boxes, graphs, tables, and so on. In certain cases, a user interface display screen may refer to all application windows presently displayed on a display.

The sections 24-32 of the UI display screen 60 include search UI controls 24, analytics settings UI controls 28, indications of data dimensions 30 of a set of data being searched, search results 26, and software action controls 32 (e.g., for performing functional manipulation of data). Rendering instructions for the UI display screen 60 may be generated via a server-side Graphical User Interface (GUI) module 36 of the enterprise data analysis software 16, and/or via client-side GUI software.

For the purposes of the present discussion, a user interface control may be any displayed element or component of a user interface display screen, which is adapted to enable a user to provide input, view data, and/or otherwise interact with a user interface. Additional examples of user interface controls include buttons, drop down menus, menu items, tap-and-hold functionality, and so on. Similarly, a user interface control signal may be any signal that is provided as input for software, wherein the input affects a user interface display screen and/or accompanying software application associated with the software.

The server-side enterprise data analysis software 16 may represent webpage software adapted to facilitate generation of content for display via the client 12, e.g., when a user employs the client 12 to browse to a website hosting the data analysis software 16 and logs into the software 16, enters any applicable authentication and/or user privileges information, and so on.

The example enterprise data analysis software 16 includes a controller 38 in communication with the client system 12, the server-side GUI module 36, and an integrated search and analytics module 40. The controller 38 further communicates with the backend database 20 and a pivot grid and query manager 18. Note that while the pivot grid and query manager 18 is shown as a separate module from the enterprise data analysis software 16 that the pivot grid and query manager 18 may be considered as part of the enterprise data analysis software, without departing from the scope of the present teachings.

The controller 38 includes computer code adapted to facilitate interfacing various modules 18, 20, 36, 40 of the server system 14 and the client system 12. Web services and/or Application Programming Interfaces (APIs) may facilitate interfacing the data analysis software 16 with the database 20 and/or pivot grid and query manager 18. The controller 38 is also adapted to handle Structured Query Language (SQL) statements and constructs for retrieving data, including data dimension hierarchy information (e.g., as hierarchy metadata characterizing retrieved transaction data), from the database 20, as discussed more fully below.

For the purposes of the present discussion, a hierarchy may be any ordering of or arrangement of data, where different data in the arrangement may exhibit superior or subordinate relationships with other data. A hierarchy may refer to a displayed representation of data objects and/or dimensions or may refer to data and accompanying relationships existing irrespective of the representation. For example, an enterprise personnel hierarchy, e.g., which may be displayed via an organizational chart (also called org chart), may be any power structure, position structure, or reporting structure characterizing an enterprise.

Metadata may be any data or information describing data or otherwise describing data and/or functionality. For example, certain metadata may describe relationships between nodes of a tree hierarchy characterizing a data set (e.g., data component, object, and/or associated tree structure).

The example integrated search and analytics module 40 includes an analytics runtime module 42, which includes an analytic generation module 44 in communication with or otherwise integrated with a search module 46. The analytic generation module 44 includes a multi-dimensional pivoting and faceting module 44 for implementing data pivoting and faceting with reference to predetermined data dimensions 50. Pivoted, filtered, and/or faceted data may be used by the analytic generation module 44 to generate pivot grids and associated analytics or graphics.

For the purposes of the present discussion, an analytic may be any data visualization or any visualization based on one or more calculations based on underlying data. A visualization may be any graphical or pictorial representation of data in accordance with a method or scheme. Example visualizations include pie charts, treemaps, bar charts, line graphs, N-boxes, maps with data layers, and so on.

Figure 5A:
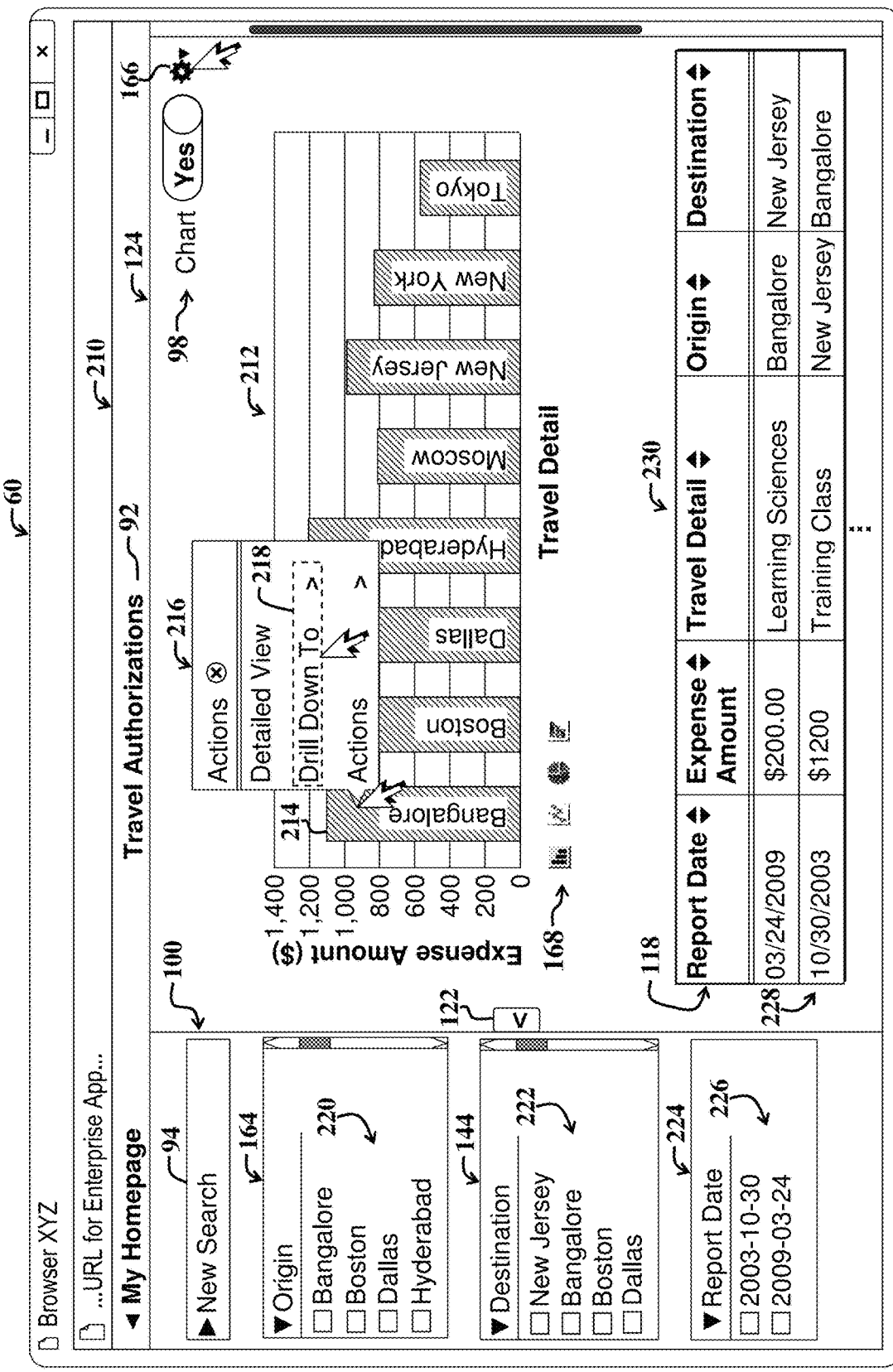
FIG. 5A illustrates a fifth example UI display screen, showing updated analytics and search results after user manipulation of chart options and deselection of certain facet filters from the fourth UI display screen of FIG. 4.

In one embodiment, an analytic displays aggregate information on a (possibly strict) subset of one or more characteristics of a plurality of characteristics (e.g., where the subset of characteristics may be specified by filter criteria or search criteria). Some of the search results (that may be displayed via the analytic) may be grouped together (and illustrated via the analytic) by the aggregate information by virtue of the grouped search results sharing the same subset of characteristics (e.g., as specified by the search or filter criteria). For example, travel to and from Bangalore may be grouped together in aggregate information for Bangalore, and travel to and from Boston may be grouped together in aggregate information (e.g., with auxiliary, related, or associated information) for Boston, as shown in FIG. 5A. Hence, certain analytics discussed herein may display aggregate information that is arranged in groups in accordance with the one or more search criteria specified via the one or more search options.

Note that in certain contexts, display of data via a pivot grid, where the pivot grid illustrates a tree structure or relationship of data, may also represent a type of analytic. Accordingly, the term "analytic" as used herein is not limited to conventional graphs or charts.

The analytics runtime 42 represents an integrated framework that is loaded in runtime memory (e.g., Random Access Memory) and used to generate analytics, and to faciliate searching, filtering, faceting, and so on, during runtime. However, note that, in accordance with various embodiments discussed herein, during filtering, faceting, searching, not all software operations are performed in memory, e.g., SQL statements are executed against (e.g., using the query manager 18) database 20 that contains transaction data.

Note that various modules of the enterprise data analysis software 16 and pivot grid and query manager 18 may be implemented as part of the same runtime code, without departing from the scope of the present teachings.

For the purposes of the present discussion, a framework may be any set of runtime computer code associated with a particular component or functionality grouping that does not require web services or separate APIs or middleware to enable communication between subcomponents of the framework. Runtime code may be any code that is loaded in temporary memory or Random Access Memory (RAM) (e.g., other than archived data on a hard drive or other storage medium) and used for execution of a software program defined, at least in part, by the runtime code.

By loading search functionality 46 and analytics generation functionality 44 in the same analytics runtime component 42, computational overhead that may otherwise result from use of network communications protocols and mechanisms or Object Linking and Embedding (OLE) methods, is reduced relative to use of separate frameworks for analytics and search functionality. Furthermore, such integration of search and analytics functionality can provide enhanced end-user experience, as search options and results and analytics (and associated user options) are presented together.

For the purposes of the present discussion, the term "separate frameworks" refers to non-coordinated substantially disparate software components, e.g., components of runtime code, for implementing searches and performing analytics.

The pivot grid and query manager 18 includes computer code for enabling configuration and determination of data models, including data dimensions associated tree hierarchies, and for generating queries using data component (e.g., object) names for user selected data components. An accompanying component data and source selection module 52 includes computer code for enabling user specification of queries and association of the queries with user defined and/or automatically defined data models, e.g., Document Object Models (DOMs). For the purposes of the present discussion, a DOM may be any language-independent convention or set of rules for representing and/or interacting with data objects, e.g., business objects.

Those skilled in the art will appreciate that one or more modules shown implemented via the server system 14 may be implemented client-side or may be spread between the client device 12 and the server system 14, without departing from the scope of the present teachings. For example, the client system 12 may include a layout engine, including a webpage retriever and client markup handler (and accompanying markup parser) that obtains DOM information from the pivot grid and query manager 18 via the controller 38 and further includes rendering instructions retrieved from the server-side GUI module 36 to facilitate client-side rendering of the UI display screen 60 and facilitates associated user interactions, as discussed more fully below.

The component data and source selection module 52 communicates with one or more source data models 54. The source data models may have attributes, e.g., "chart only," specifying certain properties of the data models, which are associated with queries established via the component data source selection module 52.

In an example scenario, a manager has employed one of the client systems 12 to browse to and log into the enterprise data analysis software 16 and to employ the associated pivot grid and query manager 18 to establish data dimensions and associated tree structure characterized by a data dimension hierarchy; to create data models; to configure or set available queries and/or facets for searching and pivoting operations to be applied to one or more selected data components or sets of data; to set up and/or select dimensions and hierarchy relationships between dimensions and data (e.g., by selecting or specifying tree structures characterizing hierarchical information for dimensions of a set of data to be searched); to select data components (e.g., data objects) and associated tree structures and sources from which the components can be retrieved, and so on. Note that a given manager may perform fewer, more, or different configurations, depending upon the needs of a given implementation, and depending upon which configurations have already been pre-established or set, such as by default.

In the present example scenario, after system configuration via the pivot grid and query manager 18, an end user employs one of the client systems 12 and accompanying browser to browse to a website or other network site identified (by a network address) hosting the enterprise data analysis software 16. After logging in to the server system 14 and associated data analysis software 16, the client-side UI display screen 60 is displayed.

Various user interface controls, e.g., the search controls 24, may be employed to access a Document Object Model (DOM) representing a selected portion of the backend database 20. To initiate a user-specified search, i.e., query, a user may select or otherwise specify search parameters via the search controls 24.

The server-side analytics runtime 42 then employs a flattened tree and SQL queries and/or other SQL language constructs to search for and selectively retrieve data from the database 20 that matches the query. Note that the data retrieved for a query need not be retrieved from a cache, which can maintain stale data, but from the database 20, which may maintain current data. Hence, no caching is needed.

For the purposes of the present discussion, a query may be any mechanism and/or process by which information is retrieved based on specified criteria, e.g., search criteria. The specified criteria may represent a question or a matching condition used to compare data of a data set for a match with the criteria, and to then subsequently return matching data as search results, also called query results. Note that a particular query is sometimes identified by and/or referred to by the search criteria. The terms "query" and "search" may be employed interchangeably herein.

In certain scenarios, a query may represent a filtering operation, where a data set is filtered in accordance with filtering criteria. In other scenarios, the query is used to retrieve a particular data component or object, or transaction data associated therewith.

A transaction search may be any query that is associated with search criteria identifying a characteristic of a particular business transaction. In general, in embodiments discussed herein, a business transaction may represent or correspond to a particular business object. For example, a search for a particular employee's travel expenses for a particular trip may represent a transaction search for a business object that contains information pertaining to the employee's travel expenses. The transaction search may return, for example, how much was spent on a particular airline ticket, and/or may return other or additional related information, e.g., identification of the destination location of a particular booked flight.

Additional details pertaining to the use of flattened tree structures and SQL language constructs to implement queries without caching are discussed more fully in co-pending U.S. patent application, entitled SUPPORT HIERARCHICAL DIMENSION ANALYSIS IN MULTI-DIMENSIONAL PIVOT GRIDS, which is fully incorporated by reference herein. Note that the overall system 10 of FIG. 1 may be implemented in accordance with the system disclosed in FIG. 1 of the above-identified co-pending US patent application, without departing from the scope of the present teachings.

In the present example scenario, an end user searches a travel authorizations data component for a particular "travel authorization" transaction that involved a flight from India to the United States within the last ten years. The data component may be selected from an initial dashboard screen, as discussed more fully below. The data component maintains multi-dimensional data.

For the purposes of the present discussion, multi-dimensional data may be any data that can be partitioned by interrelated groupings or categories. A data dimension, often simply called "dimension," may be any category, such as an amount category, used to group or categorize data.

The data component may be characterized by a hierarchical arrangement of data, including categories and sub categories, which may be represented as a tree structure. Data hierarchy information is represented by nodes of the tree structure, whereas transaction data is represented by the lowest levels of the tree structure, e.g., the leaves of the tree structure. Information characterizing hierarchical relationships between categories or dimensions of data may represent metadata.

The tree structure for the selected data component may be flattened into temporary tables, including tables preserving hierarchy information. Actual transaction data to be pulled from the database 20 in response to Structure Query Language (SQL) queries that employ hierarchy information in the temporary tree tables to access fresh data from the backend database 20.

No caching via a warehouse or cube is needed, as sought data is pulled directly from the backend database using one or more SQL constructs. Those skilled in the art with access to the present teachings will know which SQL constructs to employ and how to employ them, to meet the needs of a given implementation without undue experimentation.

The user employs the search controls 24 to specify particular parameters, e.g., a date range for the transaction. Note that available search parameters may be preconfigured via the pivot grid and query manager 18. The search controls 24 may also include various filters, e.g., check boxes, enabling a user to apply additional filter criteria, e.g., travel destination information, travel origin information, and additional travel details, e.g., one or more categories under which the sought travel authorization may be filed under.

After initiating an initial search via the search controls 24, the controller 38 of the server-side data analysis software 16 forwards the entered search criteria to the integrated search and analytics module 40. The integrated search and analytics module 40 employs the analytics generation module 44 to access predetermined data dimensions 50 any associated flattened temporary tree tables that maintain hierarchy information used by SQL constructs of the search module 46 to access data from the database 20 in accordance with the user specified search criteria.

The multi-dimensional pivoting and faceting module 48 may also be employed to organize search results retrieved by the search module. The search results may be organized via pivot grids, charts, and/or other analytics. Information pertaining to generated pivot grids, charts, etc., is forwarded to the server-side GUI module 36 for generation of rendering instructions, which are then passed to a browser of the client system 12 for rendering. Alternatively, or in addition, the client system 12 may employ a client-side rendering engine to generate rendering instructions for the pivot grids, analytics, etc.

For the purposes of the present discussion, a pivot grid may be any grid or table that is adapted to enable user repositioning or rearrangement of row headers and/or column headers (corresponding to data dimensions) and accompanying data. For example, in certain applications, a row header may be dragged to an upper edge of the pivot grid, resulting in automatic rearrangement of headers and fields (showing multi-dimensional data) represented by the table.

Furthermore, a column header of an upper table edge may be dragged to a side edge of the pivot grid (in a process called pivoting) to cause automatic rearrangement and repositioning and/or sorting of data presented via the pivot grid. Accordingly, a cross-tabular report may represent a type of pivot grid. In general, the terms "pivot grid," "pivot table," and "cross-tabular report" may be employed interchangeably herein.

Similar to spreadsheets, certain pivot grids may provide options for automatically generating subtotals and totals for grid data. Certain pivot grids may incorporate functionality for enabling users to change the layout of attributes using drag-and-drop operations, such as by pivoting or reposition data labels and the associated data layer from one location on the row or column edge to another to obtain different views of your data, supporting interactive analysis.

Resulting displayed search results 26 may include representations of tree structures, e.g., via one or more pivot grids and/or analytics, graphs, and/or other visualizations. The analytics settings controls 28 may be embedded or incorporated into the search results 26. The available analytics settings controls 28 may change or automatically adjust in accordance with the retrieved search results 26, as discussed more fully below.

Additional context-sensitive UI controls 32 are adapted to enable functional manipulation of data retrieved and shown among the search results 26. For example, a particular business object represented among the search results 26 may include an indication as to whether a particular travel plan has been authorized, and a user option to approve and/or reject an associated travel authorization, as discussed more fully below. Furthermore, depending upon details of a particular implementation, a transaction page may be opened, which may include controls for changing data; for providing additional information pertaining to employee activities (e.g., travel); for indicating sending of emails, and/or other operations or actions associated with the search results.

For the purposes of the present discussion, a software action may be any process or collection of processes or operations implemented via software. Additional examples of processes include updating or editing data in a database, placing a product order, creating an opportunity business object, creating a business contact object, adding a revenue line to a business object, displaying data visualizations or analytics, triggering a sequence of processes, launching an ERP software application, displaying a dialog box, and so on.

Software functionality may be any function, capability, or feature, e.g., stored or arranged data, that is provided via computer code, i.e., software. Generally, software functionality may be accessible via use of a user interface and accompanying user interface controls and features. Software functionality may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

The analytic generation module 44, also called the analytics runtime, is said to drive search results, where analytics and search functionality are implemented as part of the same integrated framework or runtime 40. Note that changes made via user initiated pivoting and faceting operations and/or manipulations of charts or other analytics shown in the search results 26, may result in automatic adjustments to search parameters and/or data dimensions of a tree structure used by the search module 46 to generate queries to the backend database 20.

For the purposes of the present discussion, a framework may be a set of runtime code associated with a particular software component or functionality grouping. Note that in cases where analytics and search frameworks are separate, the separate frameworks refer to relatively non-coordinated or substantially disparate software components that are run as discrete runtime components that operate separately for the purposes of implementing searches and performing analytics. Runtime code may be any code that is loaded in temporary memory or Random Access Memory (RAM or other runtime memory) and used for execution of a software program defined, at least in part, by the runtime code.

Recall that conventionally, in certain enterprise applications, use of discrete analytics and search frameworks and associated runtime code may necessitate navigation to different user interface display screens within the application to view transaction details and to analyze aggregated data associated with the transactions. Note that in such cases, an analytics runtime does not drive transaction searches, as conventional systems often lack integration between analytics and search engines. The transaction search and analytics within enterprise applications are conventionally two different entities.

The viewing of and modification of transaction details typically occurs via a separate application and separate runtime component than that used to search and analyze aggregated data associated with the transactions. Conventionally, the search and analytics framework (i.e., runtime code) are discrete. For example, conventionally, when a manager wishes to approve an expense report from an employee, the manager navigates to the expenses component and searches for the transaction to approve the same, and when the manager wishes to see the total expenses paid to the employee for the last one year, the manager must then navigate to navigate to as separate analytics dashboard. The current industry solution lacks integration between an analytics framework and a transaction search framework.

The present example system 10 is adapted to enable integrated data searching, rearrangement, and functional manipulation, e.g., enabling approval of an expense report via one or more user options accessible via the UI display screen 60 and controls thereof. Metadata associated with the expense report is adjusted to indicate that the expense report is approved upon approval thereof.

In the present example embodiment, the user may also access and manipulate representations of data dimensions 30. For example, in one embodiment, displayed data dimensions 30 may be dragged to the search results section 26 and onto a pivot grid or chart. The pivot grid and/or chart may then automatically adjust, resulting in different search results 26 in accordance with the pivoting or faceting specified by the dragging operation.

The search controls 24 may include selectable facets and/or data dimensions used to filter data. For the purposes of the present discussion, a facet may be any grouping mechanism, e.g., category, for arranging metadata, e.g., properties pertaining to underlying data, e.g., pertaining to database objects, and may themselves include properties. A label for a group of data may represent metadata.

As the user enters or specifies search criteria, manipulates the search results 26 and associated UI controls, the search results 26 may be progressively narrowed to the sought transaction. During the process, the user may obtain additional context information pertaining to the searched transaction, which may facilitate informed decision making.

At any point during the search process, the user may select a user option to save and/or apply a given session, which includes search results 26, specified analytics settings (e.g., specified via the analytics settings controls 28), and so on. Accordingly, a user may then exit the session and close the UI display screen 60. As needed, the user may then open the session and return where the user left of, i.e., to the UI display screen 60, which replicates the saved session.

Various additional operations are enabled via the system 10. For example, user options to select a portion of a graph represented among the search results 26 and to trigger a drill down operation on a particular portion of the graph and/or analytic may also be provided, as discussed more fully below. A given drill-down operation may result in display of additional detailed information pertaining to a selected portion of the chart or pivot grid. The drill-down operation may automatically generate search criteria that results in reconfiguration of the displayed search results 26 in accordance with the drill-down operation.

Hence, certain embodiments discussed herein facilitate enabling end users to open analytics (e.g., charts, pivot grids, etc.) related to a search result within any search page. Such user options allow for efficient study of data trends, pivoting, faceting, and so on, using predetermined dimensions. Use of the integrated framework 40 for search and analytics operations and actions may greatly reduce computing overhead, as compared to systems that employ disparate applications to perform analytics operations and search operations.

Furthermore, by providing user options for enabling user initiated functional manipulation of displayed data or functional manipulation based on the displayed data and/or associated context (e.g., context provided by information associated with a computing object that is associated with a displayed search result), users may efficiently initiate activities or actions (e.g., sending of electronic messages, such as emails, text messages, and so on; approving expense reports; approving vacation times; specifying employee raises; drilling down into data associated with a search result, while automatically triggering a new search based on the drill down operation; and so on) that may be relevant to one or more displayed search results.

Hence, the term "functional manipulation" as used herein may include software actions and, in certain cases, may include results of the software actions, to the extent that a given software action involves a series of related actions. User options for initiating software actions may be automatically provided in accordance with search results returned in response to a search or filtering of data.

In an example drill-down operation, user adjustments to a chart and related settings may trigger automatic adjustments to search results and pivot grids used to drive the search module 46 via the analytics generation module 44. The chart adjustments, e.g., to implement a drill-down, may trigger automatic system selection of a dimension, facet, filter, or search term or parameter in response to the drill-down action.

Any updates to data made by user manipulation of data objects of data returned among search results is stored in the backend database 20 via use of one or more SQL constructs. Furthermore, any such updates to data of the database 20 may be automatically used by the integrated search and analytics module 40 when using or accessing data objects associated with the modified data, e.g., when returning a new set of search results based on entered search criteria. The integrated search and analytics module 40 may employ SQL constructs to implement approximately real-time searches against the database 20.

In an example scenario, an end user can open analytics (e.g., charts, pivot grids, other data visualizations or graphics, and so on) related to a component or data object within any transaction search page. This allows a user to quickly study trends in data and perform multi-dimensional pivoting and faceting using the various predefined dimensions. Close integration of frameworks for search and analytics can enhance user productivity and efficiency.

As discussed more fully below, one embodiment provides for a method comprising displaying at least one search control on a user interface; accepting a signal from the search control to perform a search; displaying at least a portion of the results of the search; concurrently displaying both the at least one search control and at least one analytics control on the user interface; and accepting a signal from the at least one analytics control to specify an analytics setting to view at least a portion of the results of the search. The method may further include providing user options to adjust and/or save analytics settings and to manipulate data and/or perform other software actions applicable to or related to data represented among search results 26.

FIG. 2 illustrates a first example User Interface (UI) display screen 60 and accompanying sub-screen 90, which may be generated via the system 10 of FIG. 1, including a first UI display screen showing UI controls 68 for enabling end user selection of data components (e.g., representations of data components 76-86) for subsequent multi-dimensional, searches, filtering, and analysis via second UI display screen (e.g., the screen 90 of FIG. 2B, which represents a search and analysis window.

The example browser window 60 (which may also be called a UI display screen) illustrates that a user has browsed to a Uniform Resource Locator (URL) 64 or other network address identifier associated with the enterprise data analysis software 16 of FIG. 1.

The accompanying UI display screen 62 illustrates that an employee self-service landing page (as indicated by the label 66) is being accessed. The landing page 62 identifies various business categories 68, which may correspond to different data models, which may in turn correspond to different business objects.

In the present example embodiment, a user has selected a travel authorizations data component 78 from among the business categories 68 of multi-dimensional data. The business categories 68 are represented via various user selectable tiles 76-86. Furthermore, a user has activated a navigation menu 72 via a control bar 70. Software associated with the travel authorizations tile 78 is configured for component real time search using pivot grids.

The example navigation menu 72 provides various user options for accessing different sets of software functionality for which the user is authorized to access, e.g., as determined via user log-in credentials provided to access the UI display screen 62. The navigation window 72 includes a UI control or menu item for accessing a pivot grid wizard, an item for accessing a pivot grid viewer, an item for accessing a pivot grid administration interface, and an item for accessing a query manager.

In an example scenario, a manager is accessing the UI display screen 62 with the intention to view expense reports pertaining to employee travel, where the expense reports may be awaiting his/her approval. By selecting the travel authorizations tile 78, the manager is then able to search, view, analyze, and approve various available travel-related expense reports (where approval of an expense report represents a type of functional manipulation of data, as the term "functional manipulation" is used herein).

Figure 2A:
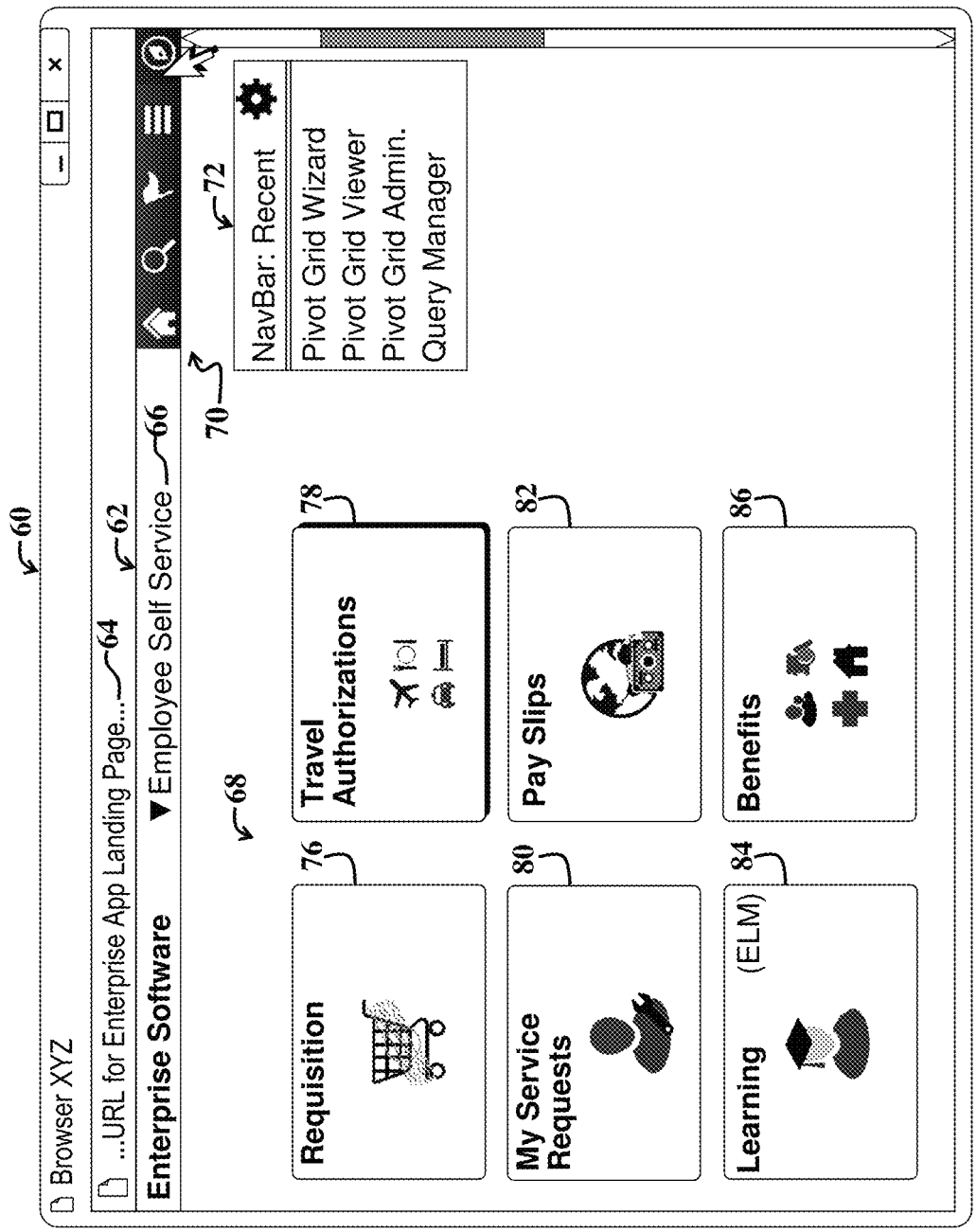
FIG. 2A illustrates a browser window and accompanying first example User Interface (UI) display screen, which may be generated via the system of FIG. 1, and which includes UI controls for enabling end user selection of data components for subsequent multi-dimensional searches, filtering, and analysis or data modification or use.
Figure 2B:
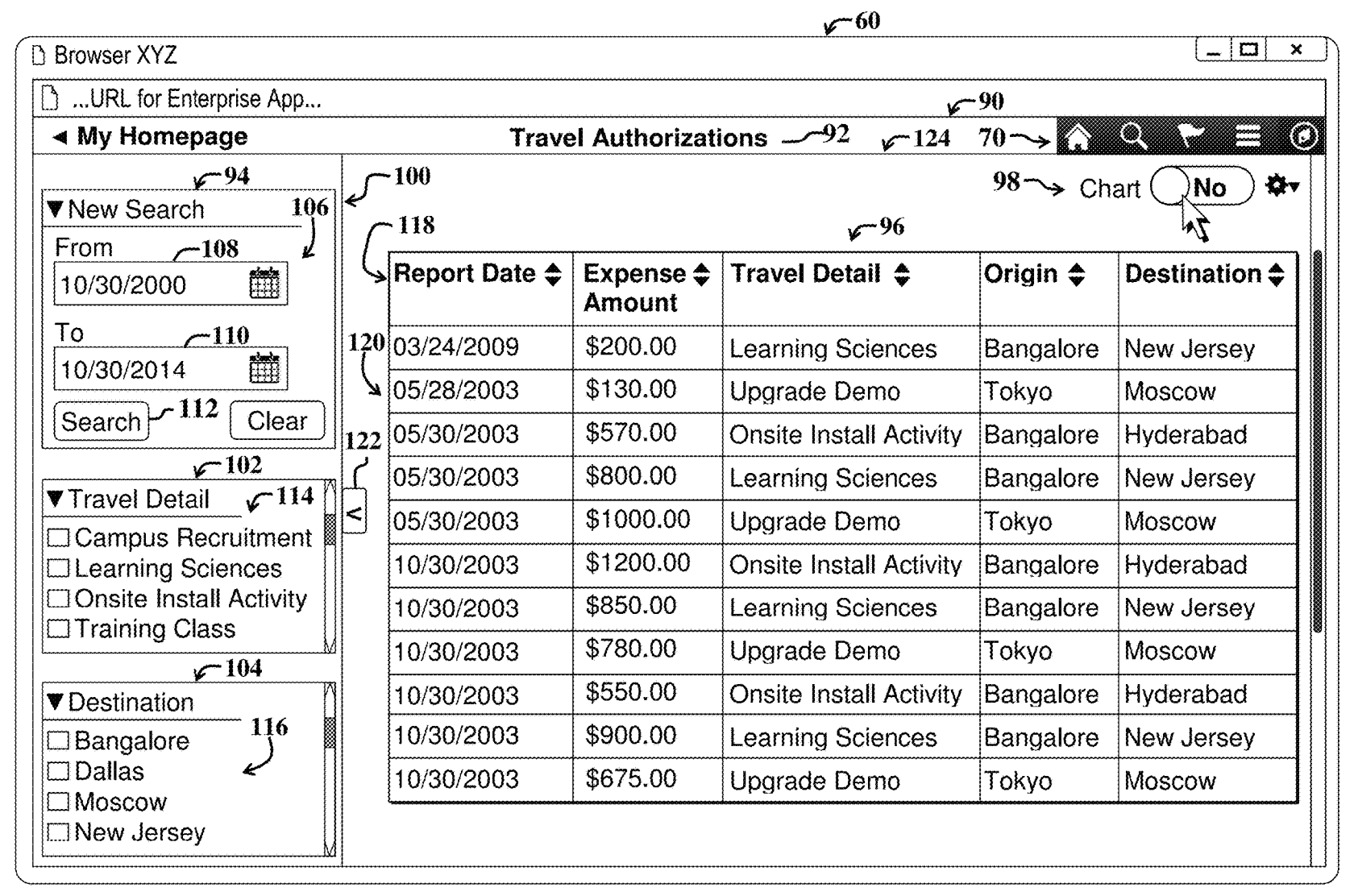

FIG. 2B illustrates a second example UI display screen 90 of a browser UI display screen 60, wherein the second example UI display screen 90 is adapted to present UI controls 94, 106, 102, 114, 104, 116 for initiating data searches, filtering, analysis, and so on, and for presenting search results via a search and analysis section 124. The second example UI display screen 90 corresponds to travel authorizations, as indicated by a UI screen label 92, and which corresponds to the selected travel-authorizations tile 78 of FIG. 2A.

The second example UI display screen 90 includes a search control section 100 adjacent to the search and analysis section 124. The search control section 100 includes a search prompt section 94, a travel detail section 102, and a destination section 104. The search control section 100 may be collapsed or hidden and selectively redisplayed via use of a collapse control 122.

The search prompt section 94 includes various user options 106 for specifying parameters for a query. For example, a date from field 108 provides a user option for specifying a starting date for a date range for which to filter displayed data. A date to field 110 enables user specification of an end date for which to limit search results. A search button 112 enables triggering a search based on query or search parameters entered via the date fields 108, 110.

The travel detail section 102 represents a travel detail business object, which represents a particular data dimension. The associated travel detail section 102 may represent a tree characterizing an associated travel detail business object, where the tree is presented with user selectable sub-dimensions 114, also called nodes. User selection of one or more of the check boxes corresponding to the sub-dimensions 114 is adapted to trigger filtering or faceting of displayed search results 96 in accordance with the user selection, as discussed more fully below.

Similarly, the destination section 104 represents a business object and associated tree hierarchy of sub-dimensions 116, which are presented as check box UI controls for enabling filtering or faceting of search results based on destination location.

Note that, in certain embodiments, the different dimensions sections 102, 104 may be adapted to be dragged and dropped into the search results section 124 to facilitate pivoting or reorganizing of any displayed analytics, as discussed more fully below.

The example search results section 124 illustrates a first table 96, which may be implemented as a pivot grid in certain implementations. The first table 96 lists search results consistent with the user date range specifications made via the search prompt section 94. The first table 96 includes a header 118 indicating various dimensions of the data 120 displayed in the table 96.

For the purposes of the present discussion, a header may be any field or label therein identifying or labeling data in a corresponding row or column. Accordingly, a column header may represent a title representative of or otherwise associated with data in a column that includes the column header. Similarly, a row header may represent a title associated with data in a row that includes the row header. A group of headers in a similar row of headers are said to represent a layer of data. Each individual header may represent a sub-layer of the layer.

A chart UI control 98 (also called chart toggle control) provides a user option for switching between display of the search results 120 as the table 96 or as an analytic or graphic, e.g., a chart.

Figure 3:
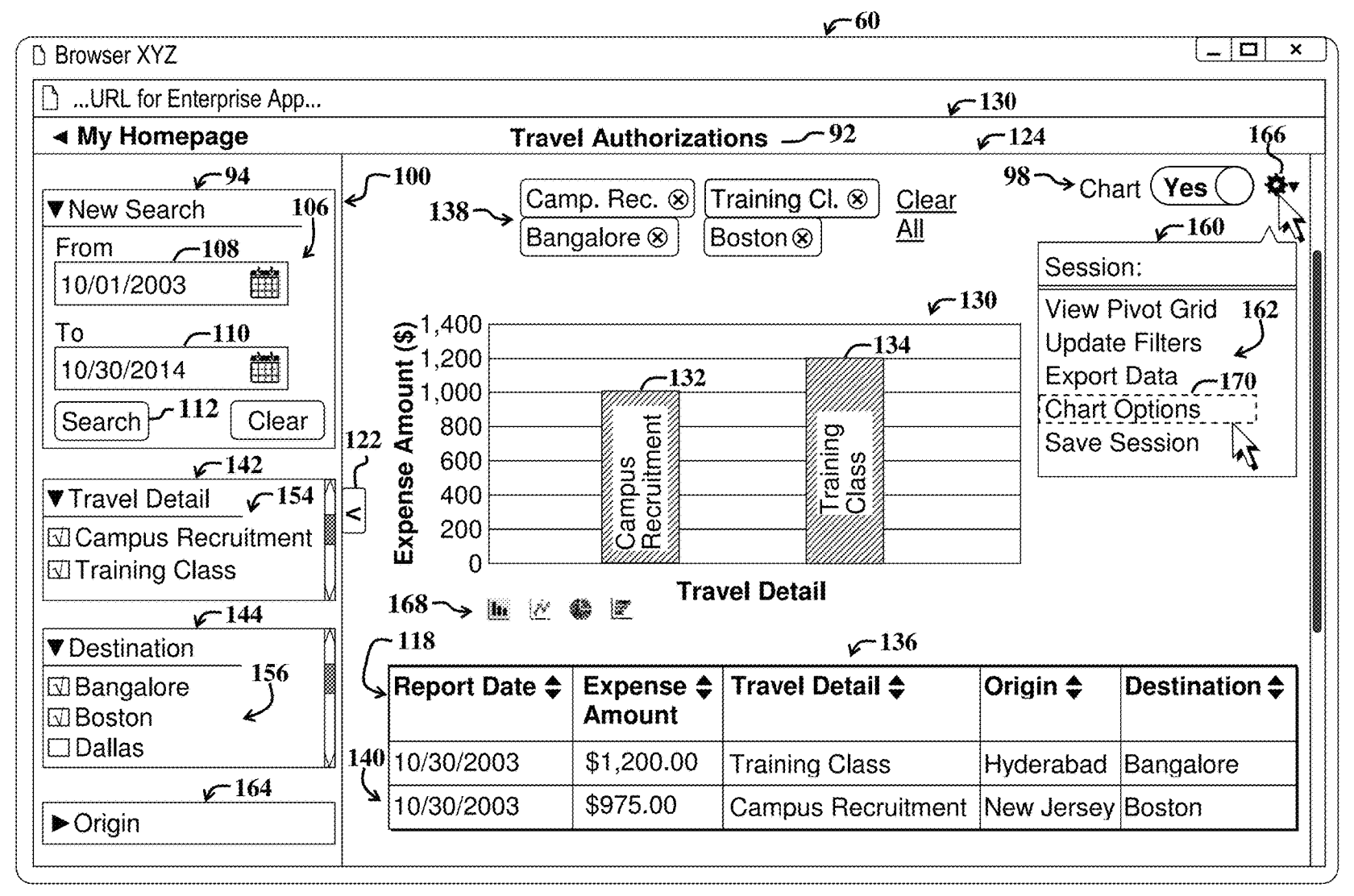

FIG. 3 illustrates a third example UI display screen 130, appearing after user selection of the chart toggle control 98; example facet filters 114; and entry of query parameters 108, 110 in the second UI display screen 90 of FIG. 2.

Note that the search control section 100 is updated to indicate user selection of check boxes associated with travel detail dimensions 154 of a travel detail section 142 and to indicate user selection of check boxes associated with destination dimensions 144 of a destination section 144.

An additional origin section 164 is shown for illustrative purposes. Note that the search control section 100 may further include any number of controls associated with different dimensions characterizing multi-dimensional data of a travel authorization data component, i.e., business object.

An updated search results section 124 shows an analytic 130, depicting travel detail versus expense amount. The analytic 130, which represents a bar chart in the present example embodiment, includes a first bar 132 corresponding to campus recruitment expenditures (corresponding to a selected dimension from among the travel detail search/filtering options 154) and includes a second bar 134 indicating training class expenditures. Note that additional chart controls 168 provide user options for changing the chart 130, such as for converting the chart 130 to a graph, converting the chart to a pie chart, or for changing the chart orientation.

An updated search results table 136 shows updated search results 140 responsive to user manipulation of search controls of the search control section 100, and further reflected via the chart 130.

Various dimensions employed to illustrate the search results via the chart 130 and table 136 are conveniently illustrated as buttons 138, which represent additional user options for deleting or otherwise manipulating the displayed search results by changing displayed dimensions.

In the present example embodiment, a user has activated a session drop-down menu 160 via user selection of a session control 166. The example session drop-down menu 160 provides various user options, including an option to view the search results via a pivot grid, an option to update filters, an option to export search result data into a specific format, an option to configure chart options, and an option to save the current session. Note that user selection of the "Update Filters" option from the drop-down menu 160 facilitates adding and/or removing user-selectable filter dimensions (also called facet dimensions herein) from the search control section 100. For example, if a user chooses to remove the "Destination" filter 144 from the UI display screen 130, the user may select the "Update Filters" option from the drop-down menu 160, which then provides user options for removing "Destination" from the search control section 100. Similarly, a new filter (e.g., "Manager Name") that is not shown in the UI display screen 130, may be added to the search control section 100 though user options provided in response to user selection of the "Update Filters" option.

If the user selects the option to save a session from the drop-down menu 160, the resulting search prompt settings 108, 110, travel detail selections 154, destination selections 156, chart options and settings used to display the chart 130, table options and settings used to display the table 136, and so on, are saved. Once saved, a user may then access the saved session (which may be saved via one or more files) to restore the UI display screen 130.

Hence, the UI display screen 130 illustrates how an end user may find a particular transaction, such as by adding or selecting descriptors or facets, which may act as filters. Not only are search results refreshed, but any displayed analytics are refreshed. Accordingly, both chart and transaction search result data are both driven by the facets and your prompts (e.g., date prompts). For example, whenever a change in the date parameters or other filters are adjusted, both the chart 130, table 136, and underlying data adjust accordingly. Hence, both chart and transaction search result data are driven by facets, prompts, and/or other search criteria or query parameters. Furthermore, note that user manipulation of chart options may further result in changing or reconfiguring the search results and underlying data, as discussed more fully below.

The simultaneous display of search controls 100 and search results 124 with accompanying analytics 130 and table(s) 136 are facilitate via use of a similar underlying integrated framework (e.g., the framework represented by the runtime 42 of FIG. 1) that may virtually simultaneously leverage both search and analytics engines.

Figure 4:
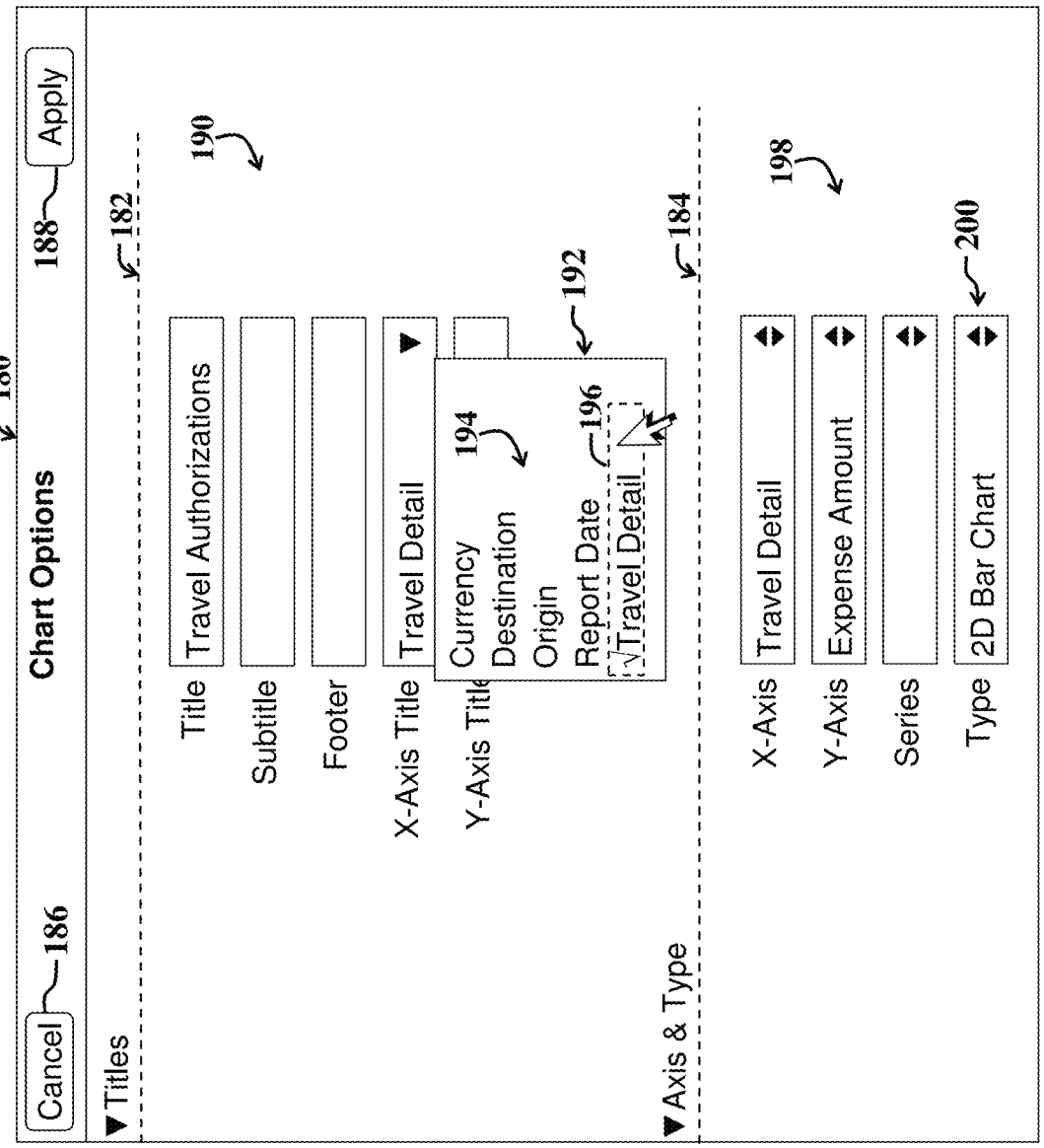
FIG. 4 illustrates a fourth example UI display screen, showing a chart options modal window appearing after user selection of a chart options control in the third example UI display screen of FIG. 3.

FIG. 4 illustrates a fourth example UI display screen 180, representing a chart options modal window appearing after user selection of a chart options control 170 in the third example UI display screen 130 of FIG. 3.

The chart options window 180 includes a cancel button 186 and an apply button 188 for cancelling or accepting, respectively, modifications made via different sections 182, 184 of the chart options window 180.

A first titles section 182 provides various user options 190, such as for changing a chart title, changing a chart axis titles, and so on. In the present example embodiment, a y-axis menu 192 of titles 194 is shown activated, whereby a user has selected a travel-detail y-axis label option 196.

Similarly, a second axis type section 184 provides various user options 198 for adjusting a chart axis and types, including a chart-type option 200 for changing a type of chart. Currently, the bar chart specified as being a 2D bar chart, as shown in the field corresponding to the chart-type option 200.

Note that various adjustments made to the different axis via controls 190, 198 of the first section 182 and section 198 may be propagated to the associated displayed table (e.g., the table 136 of FIG. 3) upon user selection of the apply button 188, such that one or more table columns and/or row labels may be adjusted accordingly.

FIG. 5A illustrates a fifth example UI display screen 210, showing an updated analytics and search results section 124 after user manipulation of chart options and deselection of certain facet filters from the control section 100 of the fourth UI display screen 130 of FIG. 4.

The updated control section 100 shows the origin section 164 and various origin-location options 220, which may be selected to further filter the selections from (or omit unselected selections from, depending upon the needs of a given implementation) the displayed search results section 124. In the present example embodiment, UI controls 222 of the destination section 144 are deselected, such that no destination location filters are applied.

Similarly, a report-date section 224 shows various check boxes 226 providing user options to select report dates. No particular report dates are selected, and hence, the displayed search results of the search results section 124 will include all report dates corresponding to the deselected report-date controls 226.

A resulting chart 212 indicates expense amount versus travel detail consistent with the user selections (or lack thereof, e.g., deselections) made via the control section 100. Similarly, a corresponding results table 230 indicates search results 228 filtered in accordance with the user selections (and/or deselections) made via the control section 100.

In the present example embodiment, a user has selected a Bangalore bar 214 from the updated bar chart 212, e.g., via a right-click option, thereby triggering display of an actions menu 216. The example actions menu 216 provides various user options, including an option to display a detailed view, an option to drill down into details associated with the associated Bangalore bar 214, and an option to access additional actions options. The additional actions option may represent a user option to display further options to perform actions, and may include options to modify underlying data, approve an expense report associated with the bar, notify (e.g., via email) another manager or enterprise personnel of the amount spent for a travel destination associated with Bangalore, and so on.

Note that the exact options provided via the actions menu 216 may vary depending upon the needs of a given implementation. Furthermore, options available via the actions menu 216 may change depending upon the underlying business object associated with the selected bar 214.

In the present example scenario, a user has selected a drill-down option 218 to drill down, i.e., to illustrate further information associated with or underlying the Bangalore bar 214. The additional information resulting from a drill-down operation may represent information contained within or otherwise accessible via an underlying business object associated with or represented by the Bangalore bar 214.

User selection of the drill-down option 218 may trigger display another sub-menu with additional options pertaining to a particular drill-down operation to be conducted. The results of a given drill-down may include a redistribution of data, e.g., display of data by another dimension specific to the Bangalore location, e.g., may present a distribution of expenses pertaining to travel where Bangalore was or is the travel destination location.

Figure 5B:
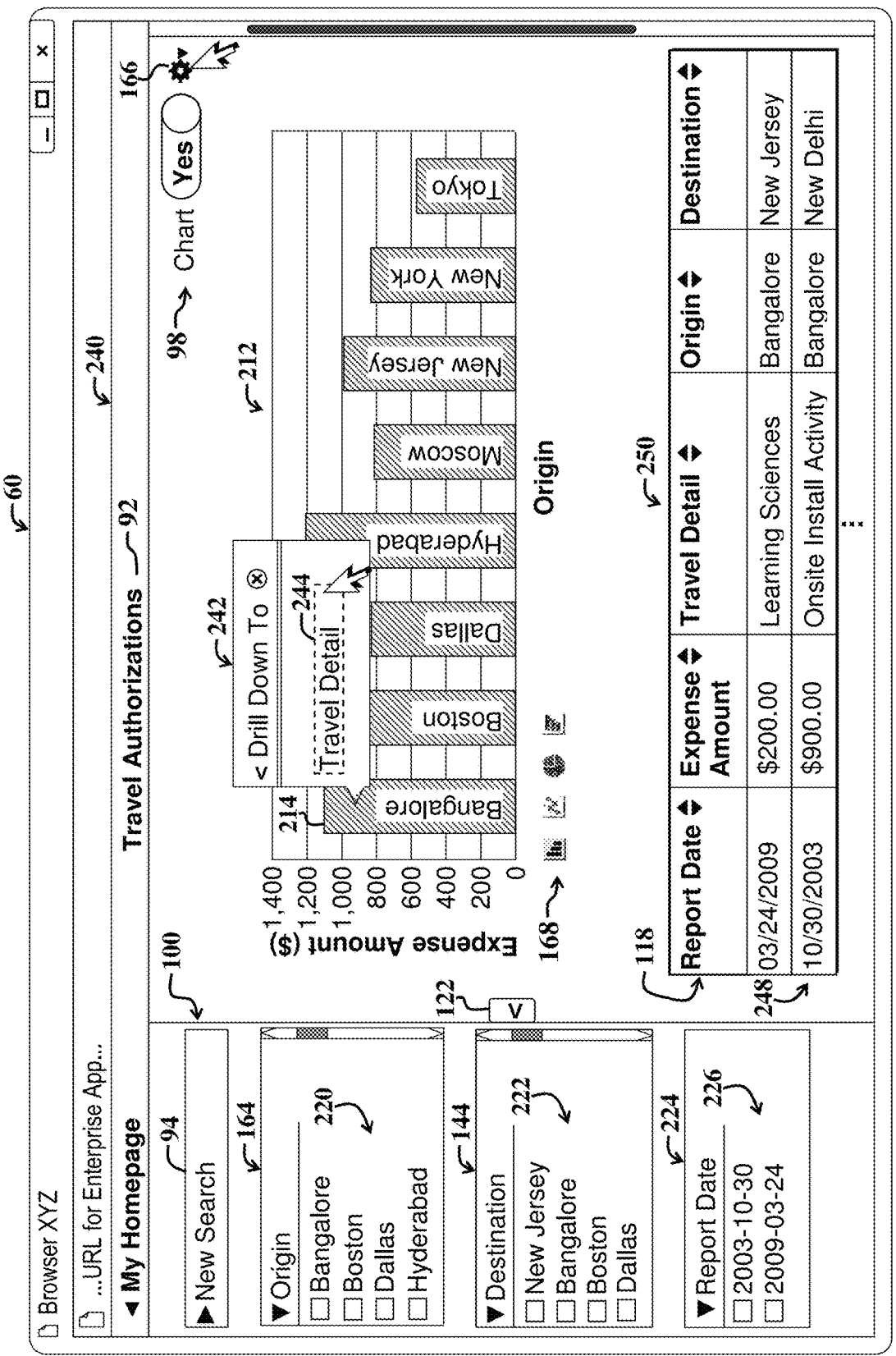
FIG. 5B illustrates a sixth example UI display screen, showing a sub-menu displayed after user selection of the drill-down option from an actions menu of FIG. 5A.

FIG. 5B illustrates a sixth example UI display screen, showing a sub-menu 242 displayed after user selection of the drill-down option 218 from the actions menu 216 of FIG. 5A.

In the present example embodiment, a user has selected, via a travel detail control 244, to drill down into travel detail information associated with the Bangalore bar 214 of FIG. 5A.

Figure 6:
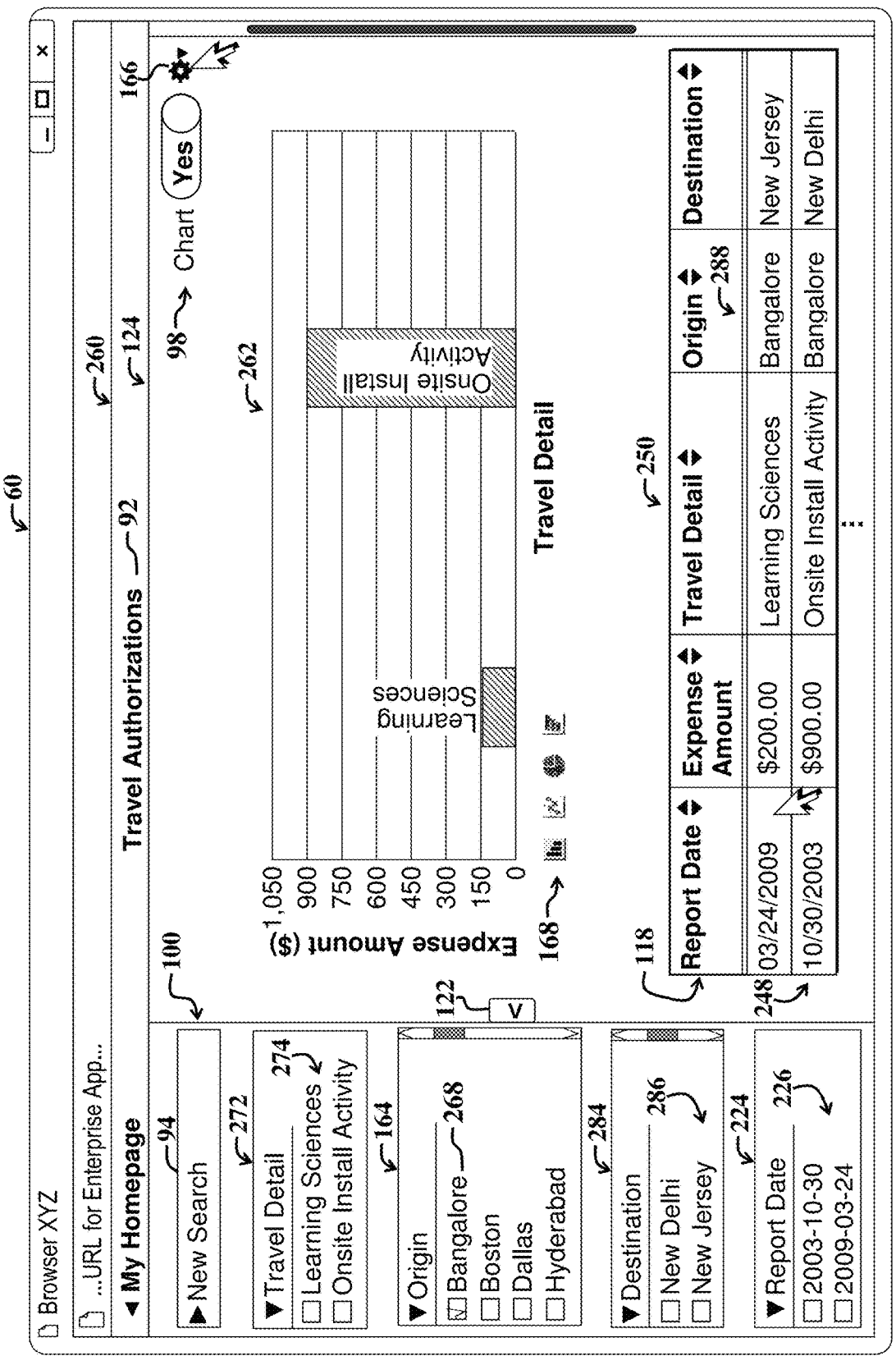
FIG. 6 illustrates a seventh example UI display screen, showing an updated control section and results section after implementation of a drill-down action selected via the sub-menu of FIG. 5B.

FIG. 6 illustrates a seventh example UI display screen 260, showing an updated control section 100 and results section 262 after implementation of a drill-down action corresponding to the travel detail drill-down option 244 selected via the sub-menu of FIG. 5B.

Note that the search control section 100 is shown including an updated origin section 164, whereby a Bangalore option 268 has been automatically selected as a filter. Similarly, a travel detail section 272 is shown updated with travel-detail options 274 applicable to the Bangalore selection. Similarly, a destination section 284 is shown automatically updated to include controls 286 associated with origin locations characterized by Bangalore.

An updated chart 262 pertaining to Bangalore destination and/or origin locations is shown, which depicts travel detail by expense amount for various travel details associated with Bangalore destination and/or origin locations. Similarly, an updated table 250 reflects results 248 associated with Bangalore, as indicated in an origin column of the updated table 250. Although a table is used in this example embodiment, it should be apparent that other ways to present search results as a collection are possible such as a list, etc.

FIG. 7 illustrates a eighth example UI display screen 300, representing a transaction authorization window activated in response to user selection of a transaction (e.g., by selecting a first row of the search results 248 of the table 250 of FIG. 6) listed in the sixth example UI display screen of FIG. 6, whereby user options 308, 312 are provided for enabling data modification and other actions.

The example transaction authorization window 300 includes a table 322 characterizing a particular business transaction 326, which represents a search result. The transaction table 322 includes a header row 324 indicating various dimensions characterizing the transaction, and a row 326 showing various fields associated with the transaction.

An example merchant control 286 provides a user option to select or specify a particular merchant to be associated with the transaction. Selection of a merchant for a transaction represents a type of functional manipulation of an underlying business object associated with the transaction, to the extent that specification of a merchant results in a change in data of the associated business object.

A detail control 288 provides a user option to provide notes or add detailed information to be associated with the business transaction. An actions control 290 may enable triggering display of a drop-down menu with various additional software actions to be associated with or used in association with the underlying business object corresponding to the found transaction.

Additional transaction details 308 indicate report information, description information, business purpose, and comments. An approve-transaction button 310 provides a user option to approve the transaction illustrated by otherwise being characterized by the transaction window 300. Furthermore, a business-purpose control 292 provides a user option to change the indication of business purpose associated with the transaction. Such options represent example user options to trigger implementation of functional manipulation of the transaction represented by the transaction window 30.

Additional fields 312 include a travel-from field and associated search control 314, a travel-to field and associated search control 316, a date-from field and associated date picker 318, and a date-to field and associated date picker, which enable a manager to configure or adjust travel date information.

After a user (e.g., a manager) is finished modifying and/or viewing the transaction window 300, the transaction may be saved, e.g., in response to user selection of a save button 304. A submit button 306 may represent a user option to submit or export the transaction, i.e., associated details illustrated via the transaction window 300, to another entity, e.g., a supervising manager.

Figure 8:
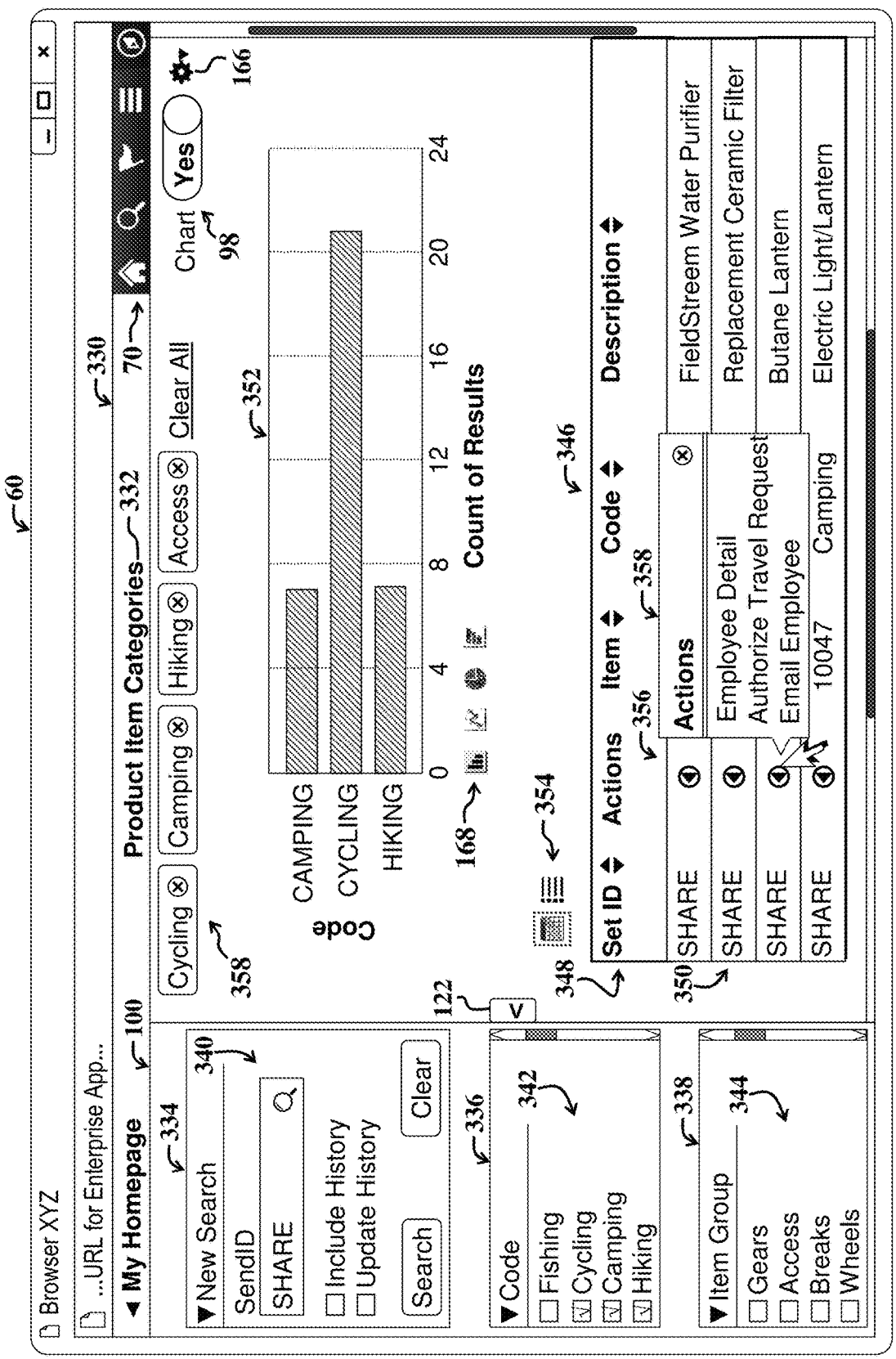
FIG. 8 illustrates an ninth example UI display screen, showing example facet dimensions, search options, and analytics for a different data component than used to generate the UI display screens of FIGS. 2-7.

FIG. 8 illustrates an ninth example UI display screen 330, showing example facet dimensions 336, 338, search options 340, 342, 344, and analytics 352 for a different data component (e.g., a product-items-categories component, as indicated via a product-item-categories label 332) than used to generate the UI display screens of FIGS. 2-7.

The associated search control section 100 includes a code section 336 with various user selectable filters or facets 342, and an item group/category section 338 with various user selectable filters or facets 344.

An example chart 352 illustrates a count of results versus item code. An example items results table 346 illustrates various search result data dimensions 348 and associated search result data 350, which may represent a data body of a table.

For the purposes of the present discussion, a data body of a table may be a collection of one or more cells of a table that are not header cells. Data body cells may include one or more measures, data values, stamps, and so on, which are displayed in cells of a table.

Rows of search data 350 are shown including actions controls 356, which may be selected to display various software actions pertinent to each illustrated transaction associated with each row of the search results 350. For example, a manager can select (e.g., by clicking on) a related action icon (from among the controls 356) to activate a menu (e.g., as shown in an example menu 358) with options to view employee detail, authorize a travel request, send an associated employee an email, and so on, while in the search page (i.e., while viewing the UI display screen 330). Table or grid controls 354 provide user options for adjusting display of the table 346, which may be presented as a pivot grid.

In the present example embodiment, a user has typed the word "SHARE" as a search term via one of the search controls 340. Additional filters or facets at 336 and 338 allow the user to control the display of search results.

Although specific search functions and controls are described, it should be apparent that other search controls and/or functions can be used.

The search results are shown via the table 346 and analytic 352, which is a chart in the present example. The chart 120 represents an analytics function for graphing the search results.

Any number and type of analytics controls and/or functions may be provided. Clicking on the chart components or bars (e.g., representing chart data) can bring up a "chart menu" that allows the user to perform analytics functions such as to drill down to a more detailed view, drill down to dimensions and related actions menus, etc.

Once an analytics view is established, subsequently changing the search term or facets causes the modified search results to be displayed with the same analytics settings. For example, if a fishing check box is selected from among the code check box controls 342, then the fishing category will appear in the chart 352. Also, if the user saves the current session, both the search results and analytics settings will be saved so that the same search results and data visualization (analytics) can be easily restored.

Figure 9:
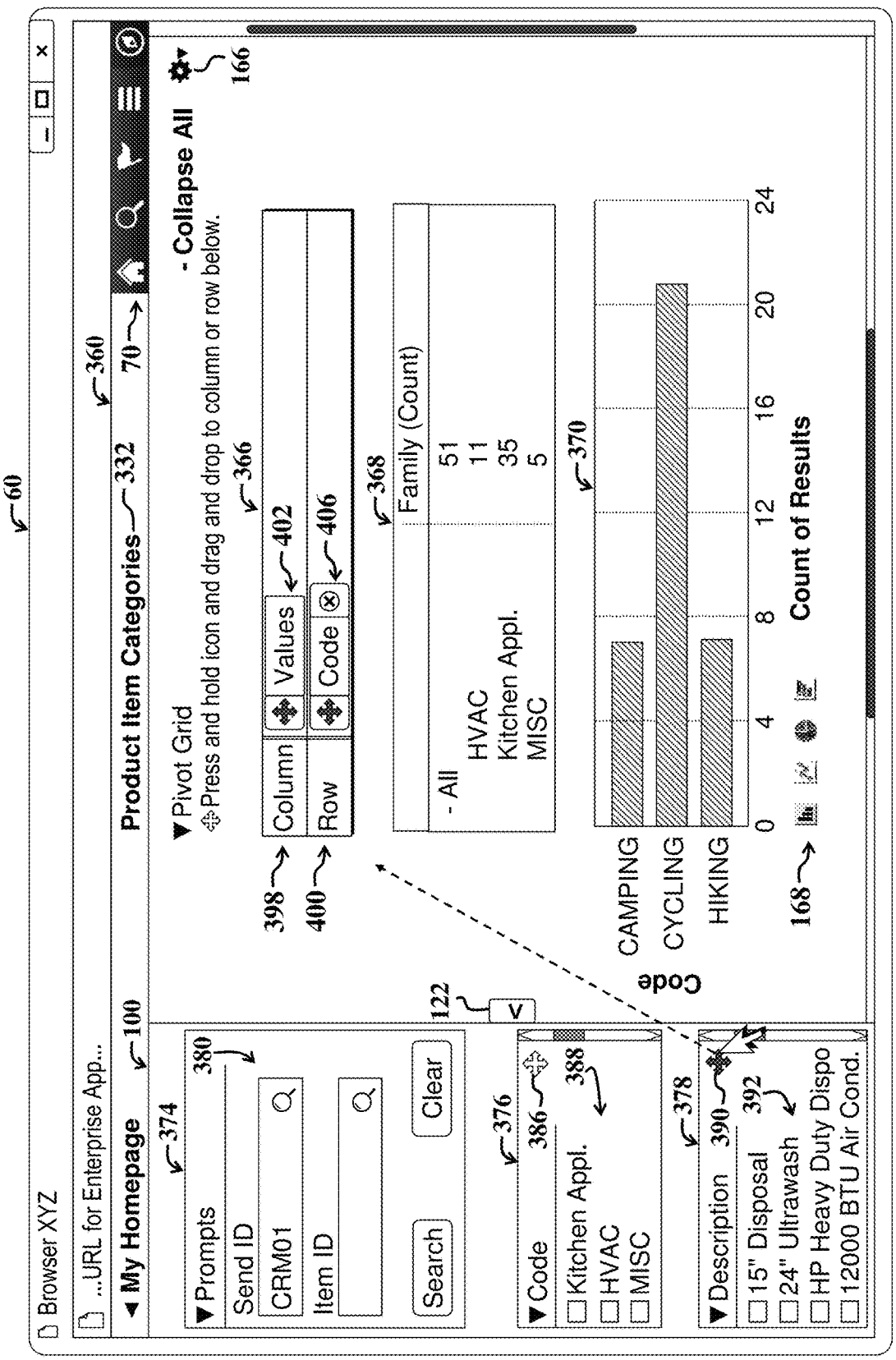
FIG. 9 illustrates a tenth example UI display screen, showing a combination of pivot grid and chart analytics, which may be displayed in response to selective user manipulation of the eighth example UI display screen of FIG. 8.

FIG. 9 illustrates a tenth example UI display screen 360, showing example facet dimensions, search options (e.g., provided via an updated search control section 100), and analytics (e.g., pivot grid 366, tree illustration 368, and graph 370).

In the present example embodiment, a prompts section 374 has been adjusted with a different SendID, as compared to the new search section 334 of FIG. 8. Accordingly, corresponding changes are automatically propagated to an updated code section 376 and description section 378.

The code section 376 lists various options 388 pertaining to one or more data components characterized by an example SendID of CRM01. Similarly, an updated description section 378 includes updated options 392 for specifying filtering or faceting criteria. Furthermore, the code section 376 and description section 378 include drag-and-drop controls 386, 390 for facilitating dragging and dropping the sections, which act as dimensions, to a column 398 or row 400 of a pivot grid 366.

The example pivot grid 366 shows a values dimension 402 positioned in the column portion 398, and includes a code dimension 406 positioned in the row portion 400.

In the present example, scenario, a user selects the description section 378 and drags it to a space adjacent to the values dimension 402 of the pivot grid 366. This results in automatic adjustment of the displayed pivot grid 366, tree 368, and graph 370 to reflect a different organization of dimensions.

Figure 10:
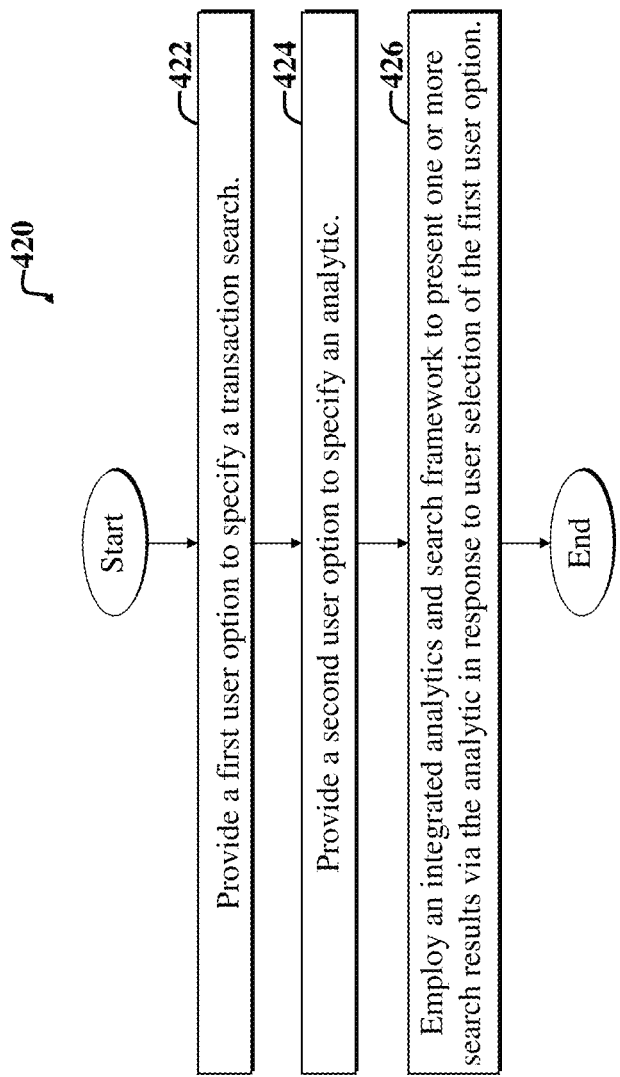
FIG. 10 is a flow diagram of a first example method adapted for use with the embodiments of FIGS. 1-9.

FIG. 10 is a flow diagram of a first example method 420 adapted for use with the embodiments of FIGS. 1-9. In the present example embodiment, the method 420 is adapted to facilitate data search, analysis, and/or use of (or manipulation or modification of) results of the data search and/or analysis.

In general, with reference to FIGS. 1 and 10, the first example method 420 is adapted for use in an enterprise computing environment that includes one or more client devices (e.g., the client system(s) 12 of FIG. 1) in communication with a server system (e.g., the server system 14 of FIG. 1), wherein the server system 14 executes webpage software 16-20 that provides webpage information (e.g., as formatted by the GUI module 36 of FIG. 1) that is accessible to the one or more client devices 12. The client device(s) 12 is/are adapted to execute steps of the first example method 420 while utilizing functionality provided by the server system 14.

The example method 420 includes a first step 422, which involves providing a first user option to specify a transaction search (such as, for example, via one or more of the search controls 106, 154, 156 of the control section 100 of FIG. 3). In general, transaction searches may return business objects or elements thereof, which are associated with a particular business transaction, e.g., category of or instance of a business-related activity, process, occurrence, or collection thereof.

With reference to FIGS. 3 and 10, a second step 424 includes providing a second user option to specify an analytic (such as via the analytic controls 168 and/or chart options 170 of FIG. 3). In this context, an analytic (such as the graph 130 of FIG. 3) may be any graphical or pictorial depiction of data and/or calculation results.

A third step 426 includes employing output from an integrated analytics and search framework to present (e.g., via the UI display screen 60 of FIG. 3) one or more search results via the analytic in response to user selection of the first user option. Output from the integrated analytics and search framework is presented via a UI display screen that integrates displayed data (including search results) and associated functionality (e.g., various UI controls), enabling a combination of transaction searches, analysis, and manipulation or other use of search results via various sections and accompanying tools provided in the UI display screen.

Note that the first example method 420 may be augmented or otherwise changed, without departing from the scope of the present teachings. For example, the method 420 may further include providing a third user option to modify data that has been displayed as a part of the one or more search results (such as the search results shown in the table of search results 136 and depicted in the associated analytic 130).

The first user option may further include one or mechanisms (e.g., as provided via various check boxes 154, 156, prompt fields 106 of FIG. 3, and draggable sections 94, 142, 144, 164) that enable user specification of one or more dimensions of a data component used for a search, by manipulation of an analytics setting (such as, for example, one or more of the settings provided via the check boxes 154, 156 of FIG. 3; chart options 180 of FIG. 4; action menu 216 of FIG. 5A, and so on).

The example method 420 may further include adjusting a display of the search results to include one or more user interface controls for enabling user access to functionality (such as the actions drop-down menu controls 356 of FIG. 8), wherein the functionality is dependent upon content of the search results. The one or more user interface controls may further provide one or more user options, in association with the display of the search results, to functionally manipulate displayed data associated with the search results. For example, the actions drop-down menu controls 356 of FIG. 8 may provide one or more user options to change data, trigger sending of an email, initiate approval of an item, and so on. Similarly, the transaction page section 300 or window (accessible via user selection of a transaction row from the search results table 250 of FIG. 6) provides various user options for changing or editing data (which represents a type of functional manipulation of the data); for approving a transaction (e.g., via the approve-transaction button 310 of FIG. 7), and so on.

One or more user options for enabling direct functional manipulation of search results from a UI display screen presenting the results may also be provided (e.g., the actions options 356 of FIG. 8). The term "direct functional manipulation" may refer to any functional manipulation (i.e., manipulation other than merely displaying data) initiated from a UI display screen that results in updating, moving, otherwise using data pertaining to the search results in response to user selection of or use of a UI control in the UI display screen, where any updating or moving of the data directly updates or moves data within a backend relational database.

The method 420 may further include leveraging server-side operations, such as by employing a server-side analytics and search frame work (e.g., the integrated search and analytics module 40 of FIG. 1) that includes a runtime (e.g., the runtime 42 of FIG. 1) that is adapted to employ one or more analytics (i.e., digital representations thereof) to drive the transaction search in response to user selection of the first user option.

The example method 420 may further include displaying a user interface display screen showing both one or more search results and one or more analytics pertaining to the one or more search results. A third user option may specify one or more dimensions (e.g., via drag-and-drop options 386, 390 shown in FIG. 9) for use in organizing the search results via the analytic (such as, for example, the analytics 368, 370 of FIG. 9).

The method 420 may further include a fourth user option to initiate a change in the user interface display screen (such as via the chart on-off button 98 of FIG. 2B), whereby the user interface display screen changes from displaying a pivot grid or table illustrating the search results to a visualization illustrating the search results.

Note that the method 420 may be further modified to include or be replaced with another method, such as a method including the following steps: displaying at least one search control on a user interface; accepting a signal from the search control to perform a search; displaying at least a portion of the results of the search; concurrently displaying both the at least one search control and at least one analytics control on the user interface; accepting a signal from the at least one analytics control to specify an analytics setting to view at least a portion of the results of the search; accepting a signal from a user input device to change the results of the search; using the current analytics setting to view the changed results of the search; and allowing a user to save a session including search results and analytics settings.

Another example method that may be used in combination with or in place of the first example method 420 of FIG. 10 is discussed more fully below with reference to FIG. 11.

FIG. 11 is a flow diagram of a second example method 440 adapted for use with the embodiments of FIGS. 1-9. The first example method 440 is adapted to facilitate data search, analysis, and/or use of results thereof in an enterprise computing environment, e.g., via one or more client devices, which may communicate with a server system.

The second example method 440 includes an initial search-options step 442, which includes employing a first user interface display screen to display one or more search options to enable user initiation of a data search.

A subsequent results-displaying step 444 includes showing one or more results of the data search via a first analytic concurrently with the one or more search options.

Next, a functional-manipulation step 446 includes providing a first user option to implement functional manipulation of data associated with the one or more search results, such as by enabling approval of a transaction or expense report; enabling modification of data of a backend relational database, and so on.

The second example method 440 may be augmented or otherwise changed, without departing from the scope of the present teachings. For example, the data search may include a transaction search, wherein the search results include one or more indications of one or more transactions (such as, for example, via the pivot grid 136 of FIG. 3). Data associated with the one or more search results may include data of a computing object (e.g., as illustrated via the example transaction page or window 300 of FIG. 7). A second user option (such as, for example, provided via the approve-transaction button 310 of FIG. 7) may enable a user to trigger the functional manipulation from user manipulation of the first analytic (e.g., in response to user selection of a row of the pivot grid 250 of FIG. 6, or via user selection of an action item provided via the actions controls 356 of FIG. 8).

The second example method 440 may further include providing a third user option to initiate a drill-down action via a menu (e.g., via the menu 242 of FIG. 5B) or control incorporated in the displayed analytic, wherein the drill-down action is based on a portion of the analytic (e.g., the bar 214 of the graph 212 of FIG. 5B) identified by user selection of the third user option via the portion.

The one or more search options may further include a fourth user option (e.g., via drag-and-drop functionality illustrated in FIG. 9 and accessible via the drag-and-drop control 390) to drag and drop a dimension onto a pivot grid associated with the first analytic, resulting in an updated second analytic in response thereto.

The second example method 440 may further include automatically selecting a data dimension, facet, filter, or search term in response to the drill-down action, and displaying data associated with the selection (e.g., as illustrated with reference to the UI display screens of FIGS. 3, 5B and 6). Note that FIG. 6 represents results after application of the Bangalore filter option 268. While not shown in FIG. 6, FIG. 6 may be adapted to further show a Bangalore breadcrumb (in addition to an updated facet area, i.e., search control section 100) analogous to the buttons 138 of FIG. 3, which indicates application of a Bangalore filter. Furthermore, note that underlying software may detect a user initiated adjustment to the analytic, and automatically adjust displayed search results and a pivot grid in response to the user initiated adjustment. Similarly, underlying software may detect a user initiated adjustment to search criteria, and then automatically adjust the displayed analytic and associated pivot grid in response to the user initiated adjustment.

The data search may include a filtering operation performed upon a first set of data (e.g., a set of data specified by or representing a data model selected during system configuration). The first set of data may be maintained in a relational database (e.g., the database 20 of FIG. 1), and one or more SQL constructs may be employed to selectively access data in the relational database in response to a user initiated query implemented via user selection of the one or more user options.

The one or more SQL constructs include an SQL construct adapted to perform an approximately real time SQL query against the database during implementation of a data search or refresh of data displayed via the user interface display screen.

The second example method 440 may further include selectively displaying one or more user options to implement the functional manipulation via one or more software actions corresponding to one or more user interface controls; and selectively altering display of the one or more user interface controls in accordance with the one or more search results.

Although the description has been described with respect to particular embodiments thereof, these particular embodiments are merely illustrative, and not restrictive. For example, while various example embodiments are discussed with respect to enterprise applications involving client-server architecture, embodiments are not limited thereto. For example, embodiments may be implemented entirely on a single computer, e.g., desktop computer or server computer, and may be used for facilitating data search, analysis, and modification of data for government, education, research, and/or other organization or individual purposes, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for facilitating concurrent search and analysis performed by an integrated search and analytics runtime module in an enterprise computing environment, the enterprise computing environment including one or more client devices in communication with a server system, wherein the server system executes webpage software, wherein the webpage software provides webpage information accessible to the one or more client devices, wherein the integrated search and analytics runtime module includes an analytics generation module integrated with a search module, the method comprising the following performed by one of the client devices:

employing a first user interface display screen to display one or more search options to enable user initiation of a data search, wherein user activation of the one or more search options employs an analytic runtime component of the integrated search and analytics module to generate a tree structure of a data component being searched, wherein the tree structure is flattened into one or more temporary tables, wherein the temporary tables are used to generate queries resulting in a collection of one or more search results of the data search;

receiving the user activation of one of the search options;

in response to the user activation of one of the search options, generating analytics including predefined dimensions;

showing, on the display screen, the collection of the one or more search results of the data search in response to the user activation of one of the search options, wherein the one or more search results are shown via a first data visualization concurrently with the one or more search options, wherein the first data visualization includes a display of the one or more search results and the analytics;

setting an analytics settings control in a first state with respect to the predefined dimensions;

varying the analytics settings control to a second state in accordance with the one or more search results, with respect to the predefined dimensions;

in response to the varying of the analytics settings control to the second state with respect to the predefined dimensions, changing dimensions of the one or more search results;

in response to a user initiated adjustment to the first data visualization, utilizing the analytics settings control in a third state associated with the user initiated adjustment to automatically adjust displayed search results and a pivot grid in response to the user initiated adjustment;

in response to selecting a first row in the set of one or more search results, providing a first set of selectable user options to implement functional manipulation of data associated with the first row, wherein in response to selecting a second row in the set of one or more search results, providing a second set of selectable user options to implement functional manipulation of data associated with the second row, wherein the second set of selectable user options is different than the first set of selectable user options, based on the item represented by the row; and in response to selecting analytics in the first data visualization associated with the first row in the set of one or more search results, changing the first set of selectable user options associated with the first row in the set of the one or more search results to a third set of selectable user options associated with the first row in the set of the one or more search results, wherein the third set of selectable user options includes a user option to drag and drop a dimension onto the pivot grid associated with the first data visualization and the analytics settings control, resulting in an updated second data visualization in response thereto.

2. The method of claim 1, wherein the data search includes a transaction search, and wherein the one or more search results include indications of one or more transactions.

3. The method of claim 1, wherein data associated with the one or more search results includes data of a computing object associated with a particular search result selected by the user.

4. The method of claim 3, wherein the functional manipulation includes one or more software actions.

5. The method of claim 4, wherein the one or more software actions include approval of an expense report associated with the computing object.

6. The method of claim 3, wherein the varying of the analytics settings controls comprises selecting a drill-down action via a menu or control incorporated in the first data visualization, wherein the drill-down action is based on a portion of an analytic identified by user selection via the portion.

7. The method of claim 6, further including automatically selecting a data dimension, facet, filter, or search term in response to the drill-down action, and displaying data associated with the selection.

8. The method of claim 1, wherein the data search includes a filtering operation performed upon a first set of data.

9. The method of claim 8, further including maintaining said first set of data in a relational database.

10. The method of claim 9, further including employing one or more Structured Query Language (SQL) constructs to selectively access data in the relational database in response to a user initiated query implemented via user selection of the one or more search options.

11. The method of claim 10, wherein the one or more SQL constructs include an SQL construct adapted to perform an approximately real time SQL query against the database during implementation of a data search or refresh of data displayed via the first user interface display screen.

12. The method of claim 1, further including:

wherein the first set of selectable user options and the second set of selectable user options are actuatable via one or more user interface controls; and selectively altering display of the one or more user interface controls in accordance with the one or more search results.

13. The method of claim 1, further including providing a set of selectable user search options to specify a transaction search;

providing a set of selectable user analytic options to specify an analytic coupled to the analytics settings control;

refining the tree structure in response to user selection of set of selectable user tree options; and using an integrated analytics and search framework to present one or more search results via the analytic in response to the user selection of the user tree options.

14. The method of claim 13, wherein the user search option further includes one or mechanisms enabling user specification of one or more dimensions of a data component used for a search, by manipulation of an analytics setting, and wherein the method further includes adjusting a display of the one or more search results to include one or more user interface controls for enabling user access to functionality, the functionality dependent upon content of the one or more search results.

15. An apparatus comprising:

a digital processor coupled to a display and to a processor-readable storage device, wherein the processor-readable storage device includes one or more instructions executable by the digital processor to perform the following acts:

employing a first user interface display screen to display one or more search options to enable user initiation of a data search, wherein user activation of the one or more search options employs an integrated search analytics module that comprises an analytic runtime component to generate a tree structure of a data component being searched, wherein the tree structure is flattened into one or more temporary tables, wherein the temporary tables are used to generate queries resulting in a collection of one or more search results of the data search;

receiving the user activation of one of the search options;

in response to the user activation of one of the search options, generating analytics including predefined dimensions;

showing, on the display screen, the collection of the one or more search results of the data search in response to the user activation of one of the search options, wherein the one or more search results are shown via a first data visualization concurrently with the one or more search options, wherein the first data visualization includes a display of the one or more search results and the analytics;

setting an analytics settings control in a first state with respect to the predefined dimensions;

varying the analytics settings control to a second state in accordance with the one or more search results, with respect to the predefined dimensions;

in response to the varying of the analytics settings control to the second state with respect to the predefined dimensions, changing dimensions of the one or more search results;

in response to a user initiated adjustment to the first data visualization, utilizing the analytics settings control in a third state associated with the user initiated adjustment to automatically adjust displayed search results and a pivot grid in response to the user initiated adjustment;

in response to selecting a first row in the set of one or more search results, providing a first set of selectable user options to implement functional manipulation of data associated with the first row, wherein in response to selecting a second row in the set of one or more search results, providing a second set of selectable user options to implement functional manipulation of data associated with the second row, wherein the second set of selectable user options is different than the first set of selectable user options, based on the item represented by the row; and in response to selecting analytics in the first data visualization associated with the first row in the set of one or more search results, changing the first set of selectable user options associated with the first row in the set of the one or more search results to a third set of selectable user options associated with the first row in the set of the one or more search results, wherein the third set of selectable user options includes a user option to drag and drop a dimension onto the pivot grid associated with the first data visualization and the analytics settings control, resulting in an updated second data visualization in response thereto.

16. A processor-readable non-transient storage device including instructions executable by a digital processor, the processor-readable storage device including one or more instructions for:

employing a first user interface display screen to display one or more search options to enable user initiation of a data search, wherein user activation of the one or more search options employs an integrated search and analytics module that comprises an analytic runtime component to generate a tree structure of a data component being searched, wherein the tree structure is flattened into one or more temporary tables, wherein the temporary tables are used to generate queries resulting in a collection of one or more search results of the data search;

receiving the user activation of one of the search options;

in response to the user activation of one of the search options, generating analytics including predefined dimensions;

showing, on the display screen, the collection of the one or more search results of the data search in response to the user activation of one of the search options, wherein the one or more search results are shown via a first data visualization concurrently with the one or more search options, wherein the first data visualization includes a display of the one or more search results and the analytics;

setting an analytics settings control in a first state with respect to the predefined dimensions;

varying the analytics settings control to a second state in accordance with the one or more search results, with respect to the predefined dimensions;

in response to the varying of the analytics settings control to the second state with respect to the predefined dimensions, changing dimensions of the one or more search results;

in response to a user initiated adjustment to the first data visualization, utilizing the analytics settings control in a third state associated with the user initiated adjustment to automatically adjust displayed search results and a pivot grid in response to the user initiated adjustment;

in response to selecting a first row in the set of one or more search results, providing a first set of selectable user options to implement functional manipulation of data associated with the first row, wherein in response to selecting a second row in the set of one or more search results, providing a second set of selectable user options to implement functional manipulation of data associated with the second row, wherein the second set of selectable user options is different than the first set of selectable user options, based on the item represented by the row; and in response to selecting analytics in the first data visualization associated with the first row in the set of one or more search results, changing the first set of selectable user options associated with the first row in the set of the one or more search results to a third set of selectable user options associated with the first row in the set of the one or more search results, wherein the third set of selectable user options includes a user option to drag and drop a dimension onto the pivot grid associated with the first data visualization and the analytics settings control, resulting in an updated second data visualization in response thereto.

17. The method of claim 1, further comprising:
in response to selection of the first or second row, the first and second set of selectable user options to implement functional manipulation of data are displayed in an overlay of the set of one or more search results.

18. The method of claim 1, wherein functional manipulation of data associated with the first row or the second row further comprises one or more selected from the group of:
modifying data associated with a respective row; and
employing the data associated with the respective row to perform a software action.

* * * * *